(12) United States Patent
Takahashi et al.

(10) Patent No.: US 7,742,691 B2
(45) Date of Patent: *Jun. 22, 2010

(54) IMAGE STABILIZER, LENS DEVICE AND IMAGER APPARATUS

(75) Inventors: Tatsuyuki Takahashi, Kanagawa (JP); Ippei Maeda, Saitama (JP)

(73) Assignee: Sony Corporation, Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 11/558,708

(22) Filed: Nov. 10, 2006

(65) Prior Publication Data

US 2007/0133967 A1    Jun. 14, 2007

(30) Foreign Application Priority Data

Dec. 8, 2005    (JP)    ............................ 2005-355248

(51) Int. Cl.
*G03B 17/00*    (2006.01)
(52) U.S. Cl. ...................................... 396/55
(58) Field of Classification Search .................. 396/52, 396/55; 348/208.99, 208.5, E5.046
See application file for complete search history.

(56) References Cited

U.S. PATENT DOCUMENTS

| | | | |
|---|---|---|---|
| 5,266,988 A | | 11/1993 | Washisu |
| 5,835,799 A | * | 11/1998 | Washisu ....................... 396/55 |
| 6,415,105 B1 | * | 7/2002 | Sasaki et al. .................. 396/55 |
| 6,741,543 B1 | | 5/2004 | Suzuki et al. |
| 2002/0112543 A1 | * | 8/2002 | Noguchi ....................... 73/618 |
| 2005/0174465 A1 | | 8/2005 | Akada |
| 2005/0265705 A1 | | 12/2005 | Uenaka |
| 2007/0133092 A1 | * | 6/2007 | Maeda et al. ............... 359/557 |
| 2007/0188620 A1 | * | 8/2007 | Takahashi .............. 348/208.99 |

FOREIGN PATENT DOCUMENTS

| | | | |
|---|---|---|---|
| JP | 3-186823 | | 8/1991 |
| JP | 409166742 A | * | 6/1997 |
| JP | 2000-258813 | | 9/2000 |
| WO | WO2005/091620 | * | 9/2005 |

OTHER PUBLICATIONS

U.S. Appl. No. 11/967,665, filed Dec. 31, 2007, Takahashi.

* cited by examiner

*Primary Examiner*—Kenneth J Whittington
(74) *Attorney, Agent, or Firm*—Oblon, Spivak, McClelland, Maier & Neustadt, L.L.P.

(57) ABSTRACT

An image stabilizer includes a driver having a coil and magnet, where a correcting lens on a moving frame is moved by the driver in a first direction perpendicular to an optical axis of a lens system and in a second direction perpendicular to the first direction and optical axis, and an optical axis of the correcting lens corresponds with the optical axis of the lens system. The coil and magnet are fixed to the moving frame and a supporting frame; the driver includes first and second coils for moving the correcting lens in the first and second directions, and a magnet applying magnetic force to those coils; and thrust generated from the first and second coils are directed in the first and second directions, each forming an angle of approximately 45° with a line connecting the optical axis of the correcting lens and the center of a lens barrel.

20 Claims, 17 Drawing Sheets

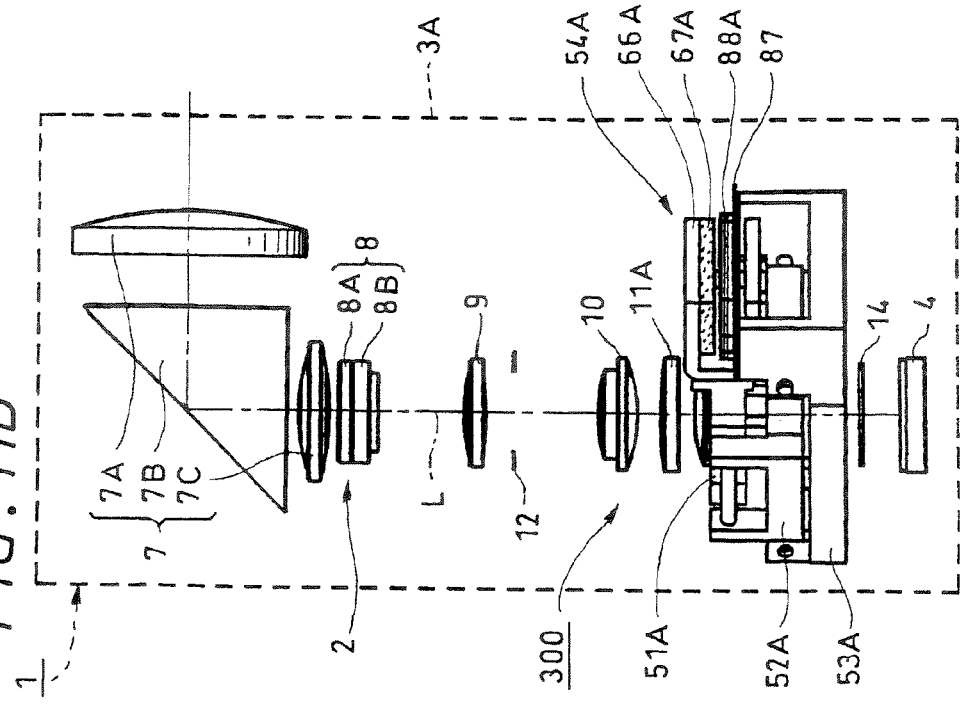
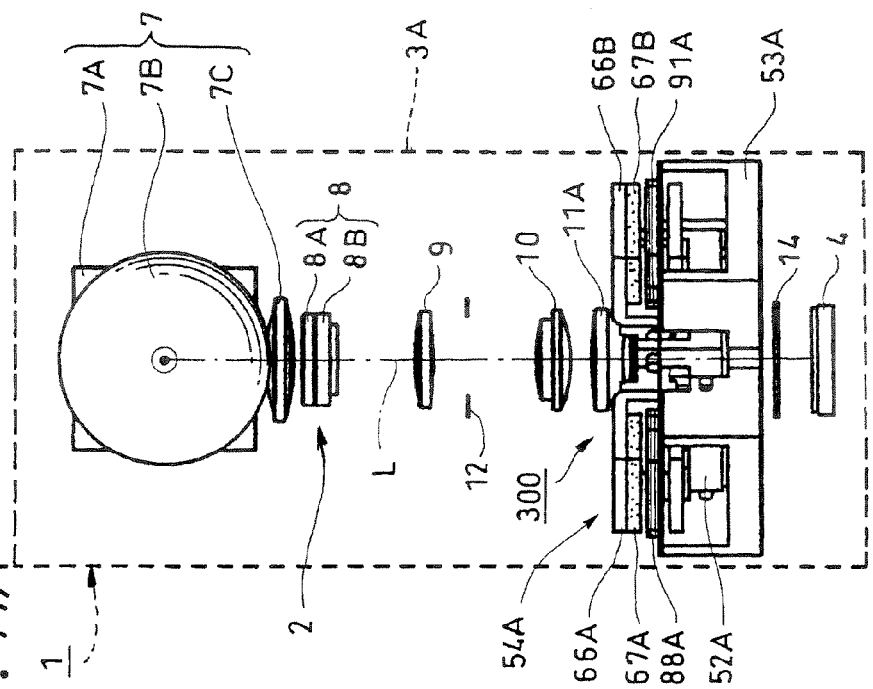

IMAGE STABILIZER, LENS DEVICE AND IMAGER APPARATUS

CROSS REFERENCES TO RELATED APPLICATIONS

The present invention contains subject manner related to Japanese Patent Application JP 2005-355248 filed in the Japanese Patent Office on Dec. 8, 2005, the entire contents of which being incorporated herein by reference.

BACKGROUND OF THE INVENTION

1. Field of the Invention

The present invention relates to an image stabilizer which stabilizes image blurred by vibration or the like at the time of shooting; a lens device which has the image stabilizer; and an imager apparatus such as a digital still camera or video camera, incorporating the lens device.

2. Description of the Related Art

In recent years, performance of an imager apparatus such as a digital still camera and a video camera has been improved remarkably, and it became possible for anyone to easily shoot still pictures and moving pictures with high image quality and with high efficiency. Improved efficiency of such an imager apparatus owes to high performance of an imager apparatus such as a lens, a CCD, and an image processing circuit.

However, even though the lens, the CCD and the like can be made higher in performance, if camera shake or vibration is caused by photographer's hands holding a camera (imager apparatus), blurring occurs in images with high resolution and shot images are blurred. Therefore, some relatively expensive cameras are provided with an image stabilizer capable of stabilizing images blurred by camera shake and the like upon image pickup. However, cameras that require such image stabilizer are not professional-level cameras, and it is to be understood that image stabilizers are indispensable to consumer cameras for a large number of amateur photographers with less shooting experience.

Further, in general, a demand for smaller and lighter cameras (imager apparatuses) is strong and most of photographers like cameras which are light in weight and easy to carry. However, since an image stabilizer in related art is comparatively large in size, when such large image stabilizer is mounted on a camera body, the whole of the camera becomes large in size, which is against a demand for making cameras smaller in size and lighter in weight. In addition, image stabilizers in related art require a large number of components, thereby causing a problem in which a cost of cameras increases as the number of components increases.

Japanese Patent Application Publication No. H3-186823 discloses an image stabilizer of this kind in related art, for example. In this Patent Literature, there is described one relating to a vibration-prevention device provided in a camera or the like, which detects camera shakes relatively low in frequency and uses the detected results as information for the prevention of image blurring, thereby preventing image blurring. The vibration-prevention device described in this Patent Literature (hereinafter referred to as "a first related-art example") is a vibration-prevention device for a camera, including: a correcting optical mechanism, a vibration detector and a vibration-prevention controller. The correcting optical mechanism is provided inside a lens barrel holding a lens group and deviates the optical axis of the lens group. The vibration detector detects vibration applied to the lens barrel. The vibration-prevention controller prevents vibration by driving the correcting optical mechanism based upon a signal from the above-described vibration detector. The correcting optical mechanism has: a correcting lens, a fixing frame, a first holding frame, a second holding frame, first and second coils, first and second drivers, and first and second position detectors. The fixing frame fixes the correcting lens. The first holding frame holds the fixing frame such that the fixing frame can be moved in the first direction different from the optical axis direction of the lens group. The second holding frame holds the first holding frame such that the first holding frame can be moved in the second direction different from the optical axis direction and the first direction, and is fixed to the lens barrel. The first and second coils move the first and second holding frames in the first and second directions, respectively. The first and second drivers are formed of first and second magnetic field generating members facing the first and second coils. The first and second position detectors detect the amount in which the fixing frame and the first holding frame are moved in the first and second directions. At least either the first and second magnetic field generating members or the first and second position detectors are provided in a fixed member including the second holding frame, fixed to the lens barrel.

According to the vibration-prevention device with the structure described in Japanese Patent Application Publication No. H3-186823, there can be expected such effectiveness that the vibration-prevention device responds up to high-frequency vibration without increasing the cost and requiring a large space (refer to "Effect of the Invention").

Japanese Patent Application Publication No. 2000-258813 discloses another example of an image stabilizer in related art, for example. In this Patent Reference, there is described one relating to an image stabilizer used for optical equipment and a lens barrel using the image stabilizer. The image stabilizer described in this Patent Reference (hereinafter referred to as "a second related-art example") is an image stabilizer which stabilizes images by moving part of a imaging lens to the inside of a surface perpendicular to an optical axis, including: a lens holding frame, a first guide, a second guide, a first driver, a second driver, and a position detector. The lens holding frame holds a correcting lens. The first guide guides the lens holding frame to move in a first direction within a surface perpendicular to the optical axis. The second guide guides the lens holding frame to move in a second direction perpendicular to the first direction. The first driver and second driver drive the lens holding frame in the first and second directions, respectively. The position detector detects the position of the correcting lens. In this image stabilizer, the first guide and the second driver, or the second guide and the first driver are arranged to partially overlap, when seen from an optical axis direction.

According to the image stabilizer with the structure described in Japanese Patent Application Publication No. 2000-258813, the following effectiveness may be obtained, for example. Specifically, the width and height of the stabilizer can be reduced by arranging a guide shaft for moving a correcting lens, and a coil or magnet for driving the correcting lens such that a pitch moving mechanism and a yaw driver, or a yaw moving mechanism and a pitch driver are arranged to overlap when seen from an optical axis direction (see paragraph [0032]).

However, regarding the aforementioned first and second related-art examples, a holding frame which has a correcting lens is guided and supported in a movable manner in a first direction and second direction perpendicular to each other, and the first and second directions are set to be the same as the directions in which the correcting lens is moved by first and second drivers. Hence, there has been a problem that the whole of an image stabilizer becomes large and it may be difficult to be small-sized.

Such problem will be explained in detail using FIGS. 19A and 19B. FIGS. 19A and 19B schematically show the moving range of a correcting lens in a first direction X and in a second direction Y perpendicular to each other. In FIG. 19A, regarding the two axes perpendicular to each other, the first direction X is plotted on the horizontal axis and the second direction Y is plotted on the vertical axis. With those X and Y axes being reference axes, moving range in the rightward and upward directions thereof is designated as the positive (+) and moving range in the leftward and downward directions thereof is designated as the negative (−). A quadrilateral CL shown with a broken line represents a correcting lens being in focus without an image blur. With the position of this correcting lens being a reference, a correctable region M is set on the left and right sides (the rightward direction being positive and the leftward direction being negative) in the first direction X (the total correctable region is 2M), and a correctable region M is set on the upper and lower sides (the upward direction being positive and the downward direction being negative) in the second direction Y (the total correctable region is 2M).

The total correctable region 2M is obtained by adding a modification value calculated by considering dispersion of dimensions of mechanical components or the like to a reference value that is the correction range of the correcting lens necessary to correct an image blur generated. For example, if a correction amount is shown with an inclination angle in the direction of an optical axis, the correction angle equals to ±0.5°. Accordingly, as shown in FIG. 19B, the correction lens is capable of moving on the +side by a maximum range M and on the −side by a maximum distance M in the X-axis direction being the first direction X. Similarly, also in the Y-axis direction being the second direction Y, the correction lens is capable of moving on the +side by a maximum range M and on the −side by a maximum range M. Note that a moving range in the X-axis direction and a moving range in the Y-axis direction may not be equal.

Upon considering a cylindrical barrel in which a correcting lens with such correctable region is stored, an internal diameter necessary for the barrel may be the size of a length D that is the length of the correcting lens in the diagonal direction. On this occasion, moving range of the correcting lens in the X-axis direction or Y-axis direction has one to one relationship with an output from a first driver or second driver. Specifically, if the first driver outputs a driving force of 1, the correcting lens moves in the X-axis direction by a distance of M corresponding to the output of 1. Similarly, if the second driver outputs a driving force of 1, the correcting lens moves in the Y-axis direction by a distance of M corresponding to the output of 1.

In this regard, if the first driver and second driver are operated simultaneously, the correcting lens moves by a distance $\sqrt{2}M$ in a direction of the resultant force obtained by combining vectors in the X-axis direction and in the Y-axis direction, in other words, moves in an oblique direction at an angle of 45° that is a diagonal direction bisecting an angle (90°) made by the X axis and Y axis. As a result, the moving range of the correcting lens is made large, causing an image stabilizer to be prevented from being small-sized.

SUMMARY OF THE INVENTION

There is a need for obtaining an image stabilizer that is small sized as a whole. In related art, there is one-to-one relationship between moving range of a correcting lens and driving force required for the movement, and so the movement-capable region of the correcting lens is relatively large, thereby making it difficult to miniaturize the whole of an apparatus such as an image stabilizer.

According to an embodiment of the present invention, there is provided an image stabilizer including a driver having a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner. Further, the driver includes a first coil for moving the correcting lens in the first direction, a second coil for moving the correcting lens in the second direction, and a magnet for applying magnetic force to the first coil and the second coil. The first coil and the second coil are disposed such that a direction of thrust generated from the first coil by the magnetic force of the magnet is the first direction and a direction of thrust generated from the second coil by the magnetic force of the magnet is the second direction respectively, each forming an angle of approximately 45° with a line connecting the optical axis of the correcting lens and the center of a lens barrel.

According to an embodiment of the present invention, there is provided a lens device including an image stabilizer which has a driver including a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner in the image stabilizer. Further, the driver includes a first coil for moving the correcting lens in the first direction, a second coil for moving the correcting lens in the second direction, and a magnet for applying magnetic force to the first coil and the second coil. The first coil and the second coil are disposed such that a direction of thrust generated from the first coil by the magnetic force of the magnet is the first direction and a direction of thrust generated from the second coil by the magnetic force of the magnet is the second direction respectively, each forming an angle of approximately 45° with a line connecting the optical axis of the correcting lens and the center of a lens barrel.

Further, according to an embodiment of the present invention, there is provided an imager apparatus including a lens device having an image stabilizer which includes a driver including a coil and a magnet capable of moving relatively. The driver controls a correcting lens held on a moving frame to move in a first direction perpendicular to an optical axis of a lens system and in a second direction perpendicular to the first direction and the optical axis, and controls an optical axis of the correcting lens to correspond with the optical axis of the lens system, stabilizing images. One of the coil and the magnet is fixed to the moving frame and the other is fixed to a supporting frame supporting the moving frame in a movable manner in the image stabilizer. Further, the driver includes a first coil for moving the correcting lens in the first direction, a second coil for moving the correcting lens in the second direction, and a magnet for applying magnetic force to the first coil and the second coil. The first coil and the second coil are disposed such that a direction of thrust generated from the first coil by the magnetic force of the magnet is the first direction and a direction of thrust generated from the second coil by the magnetic force of the magnet is the second direction respectively, each forming an angle of approximately 45° with a line connecting the optical axis of the correcting lens and the center of a lens barrel.

In an image stabilizer, a lens device and an imager apparatus according to the embodiments, a first coil and a second coil are disposed such that thrust generated by the first coil and thrust generated by the second coil are directed at an angle of approximately 45° with respect to the line which connects an optical axis of a correcting lens and the center of a lens barrel. Therefore, the whole of an apparatus can be small-sized without the performance of image stabilization being deteriorated, and with the same moving range (correctable region) as that of a related-art apparatus being secured.

BRIEF DESCRIPTION OF THE DRAWINGS

FIGS. 4A to 4C show the image stabilizer in FIG. 2, in which FIG. 4A is a front view, FIG. 4B is a rear view and FIG. 4C is a left side view;

FIGS. 5A to 5C show an example of arranging a position detector of a correcting lens in an image stabilizer according to a first embodiment of the present invention, in which FIG. 5A is a plan view, FIG. 5B is a front view and FIG. 5C is an explanatory diagram showing relevant parts of FIG. 5B in an enlarged manner;

FIGS. 9A to 9C show the image stabilizer in FIG. 7, in which FIG. 9A is a front view, FIG. 9B is a rear view and FIG. 9C is a left side view;

FIGS. 11A and 11B are views for explaining a lens device according to a first embodiment of the present invention, in which FIG. 11A is a front view and FIG. 11B is a left side view;

FIGS. 12A and 12B are views for explaining a lens device according to a first embodiment of the present invention, in which FIG. 12A is a plan view and FIG. 12B is a perspective view;

FIG. 20A is a plan view and FIG. 20B is an explanatory diagram of a first-group lens respectively.

DESCRIPTION OF THE PREFERRED EMBODIMENTS

A first coil and a second coil are disposed such that thrust generated by the first coil and thrust generated by the second coil are each directed at an angle of approximately 45° to the line which connects an optical axis of a correcting lens and the center of a lens barrel. Accordingly, an image stabilizer, a lens device and an imager apparatus, the whole of which is capable of being small-sized, can be obtained without causing deterioration in the performance of image stabilization, with the same moving range (correctable region) as that of a related-art apparatus being secured and with simple structure.

Figure 1:
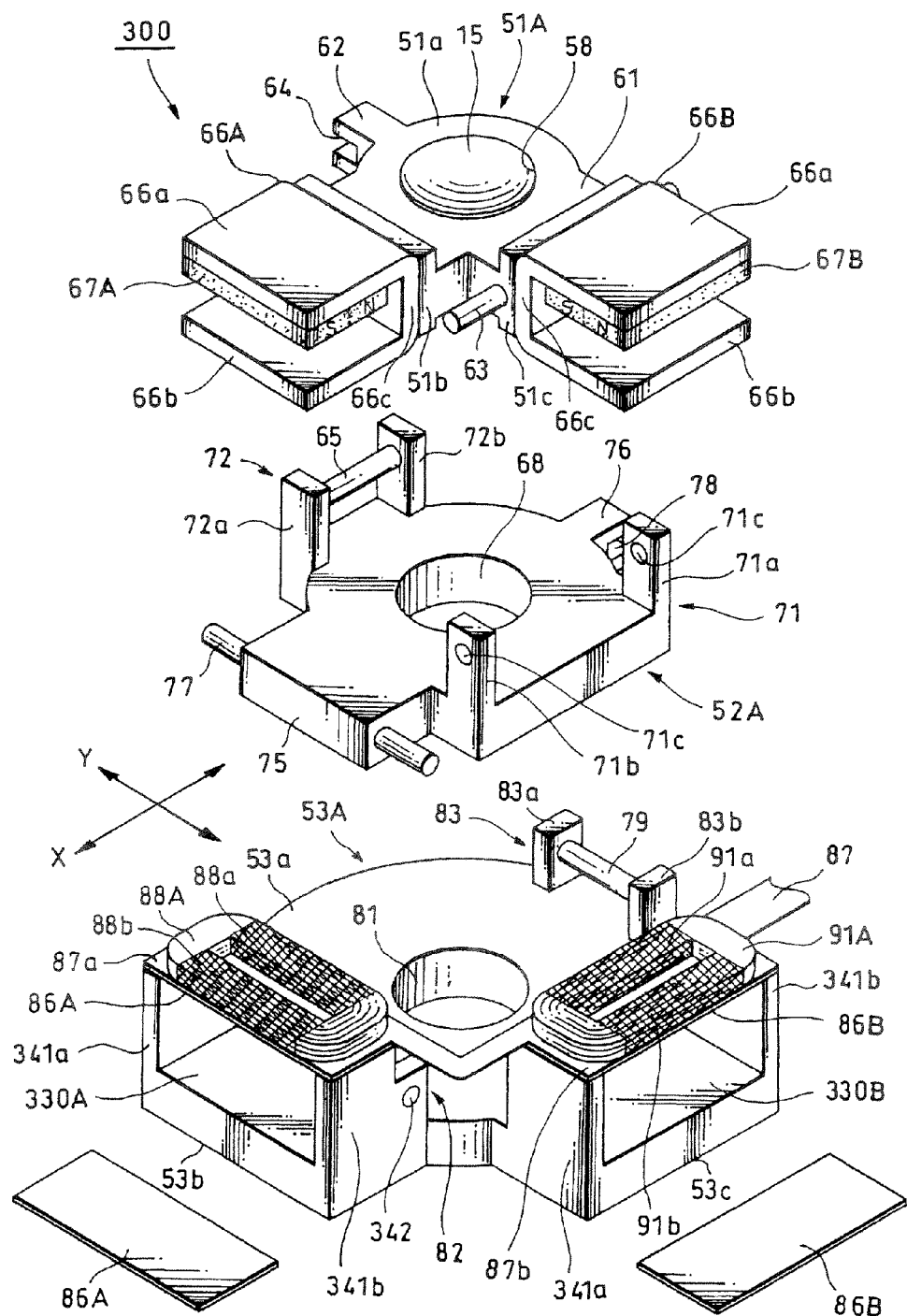
FIG. 1 is an exploded perspective view showing an image stabilizer of a moving magnet system, which is an image stabilizer according to a first embodiment of the present invention.
Figure 2:
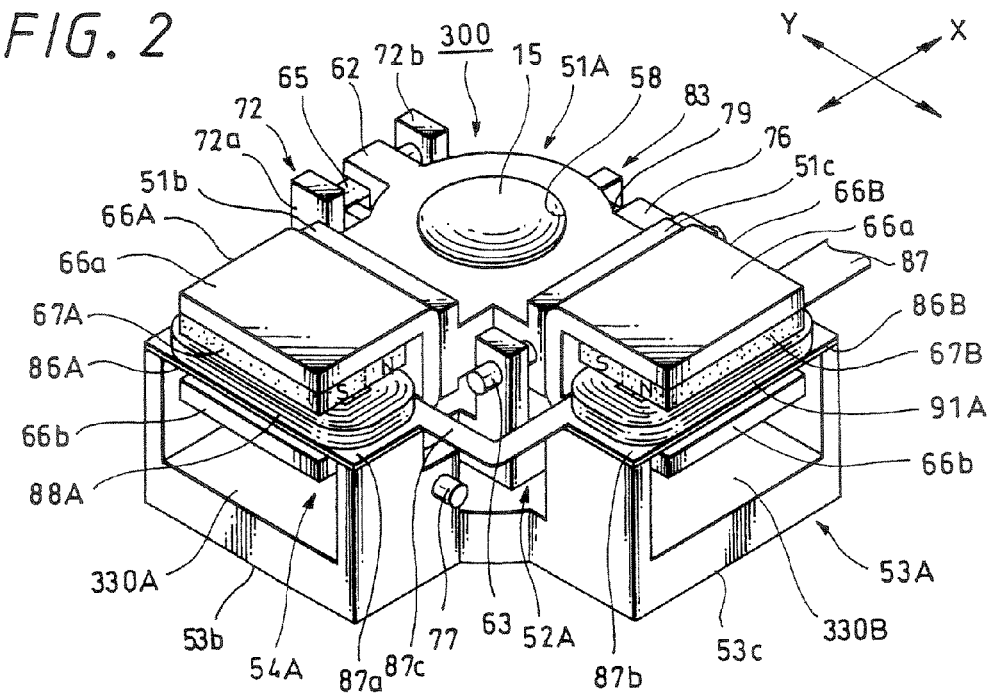
FIG. 2 is an external perspective view in which the image stabilizer in FIG. 1 has been assembled.
Figure 3:
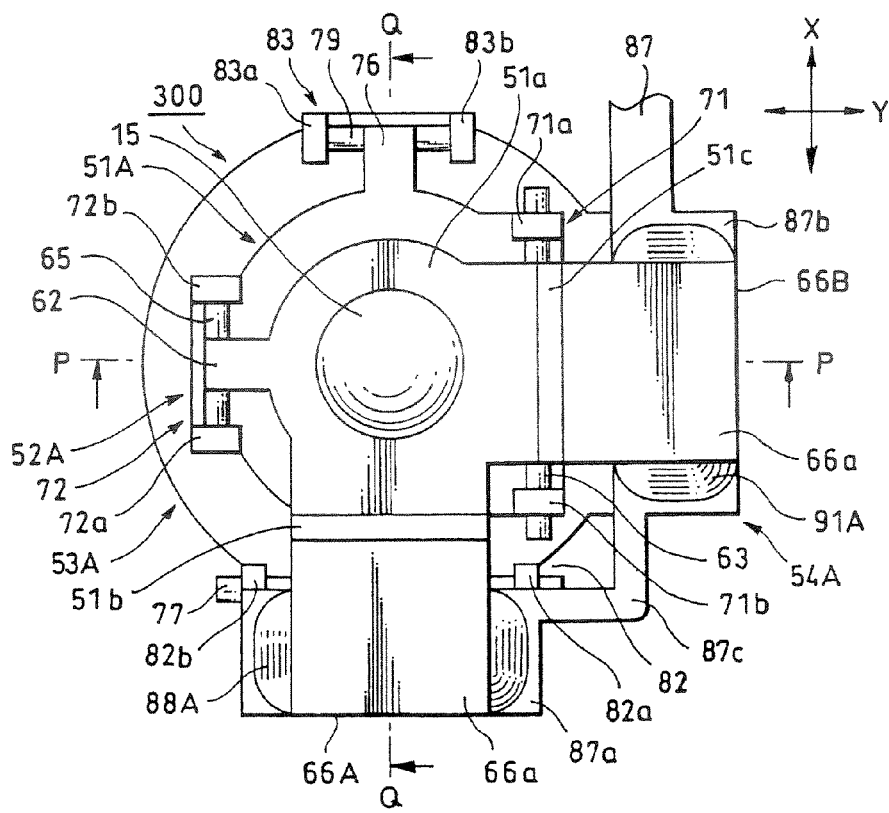
FIG. 3 is a plan view showing the image stabilizer in FIG. 2.
Figure 4A:
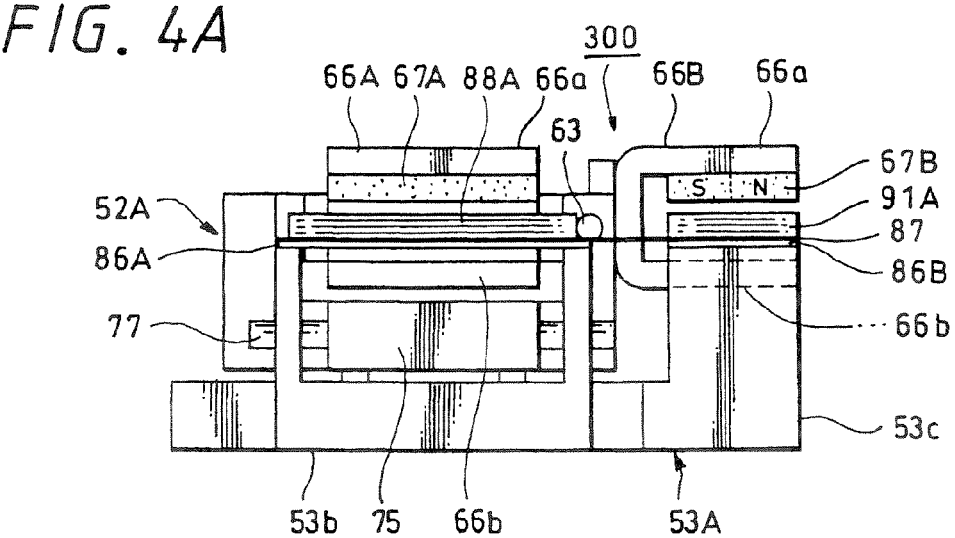
Figure 4B:
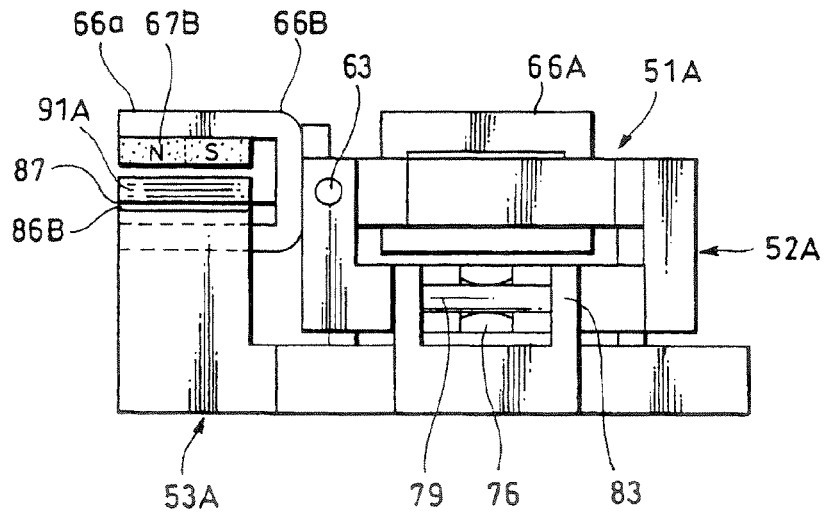
Figure 4C:
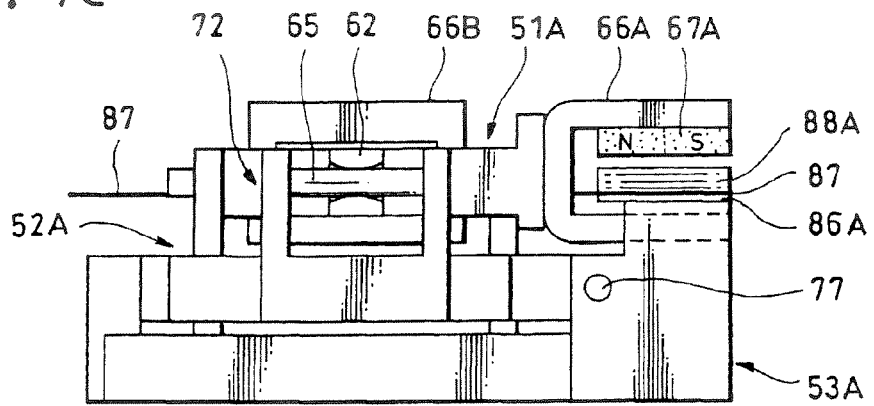
Figure 5A:
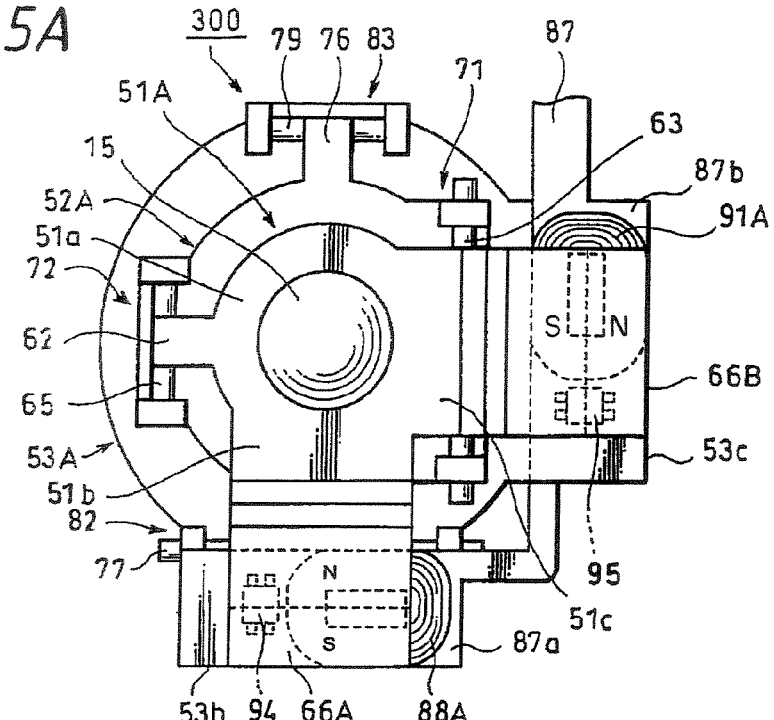
Figure 5B:
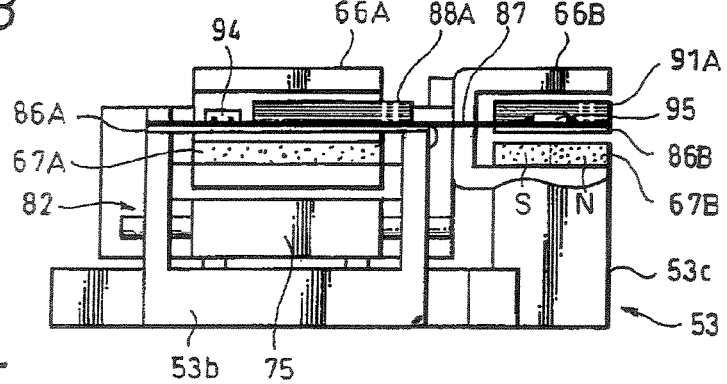
Figure 5C:
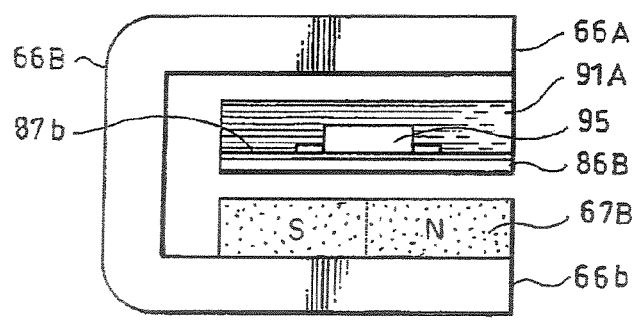
Figure 6:
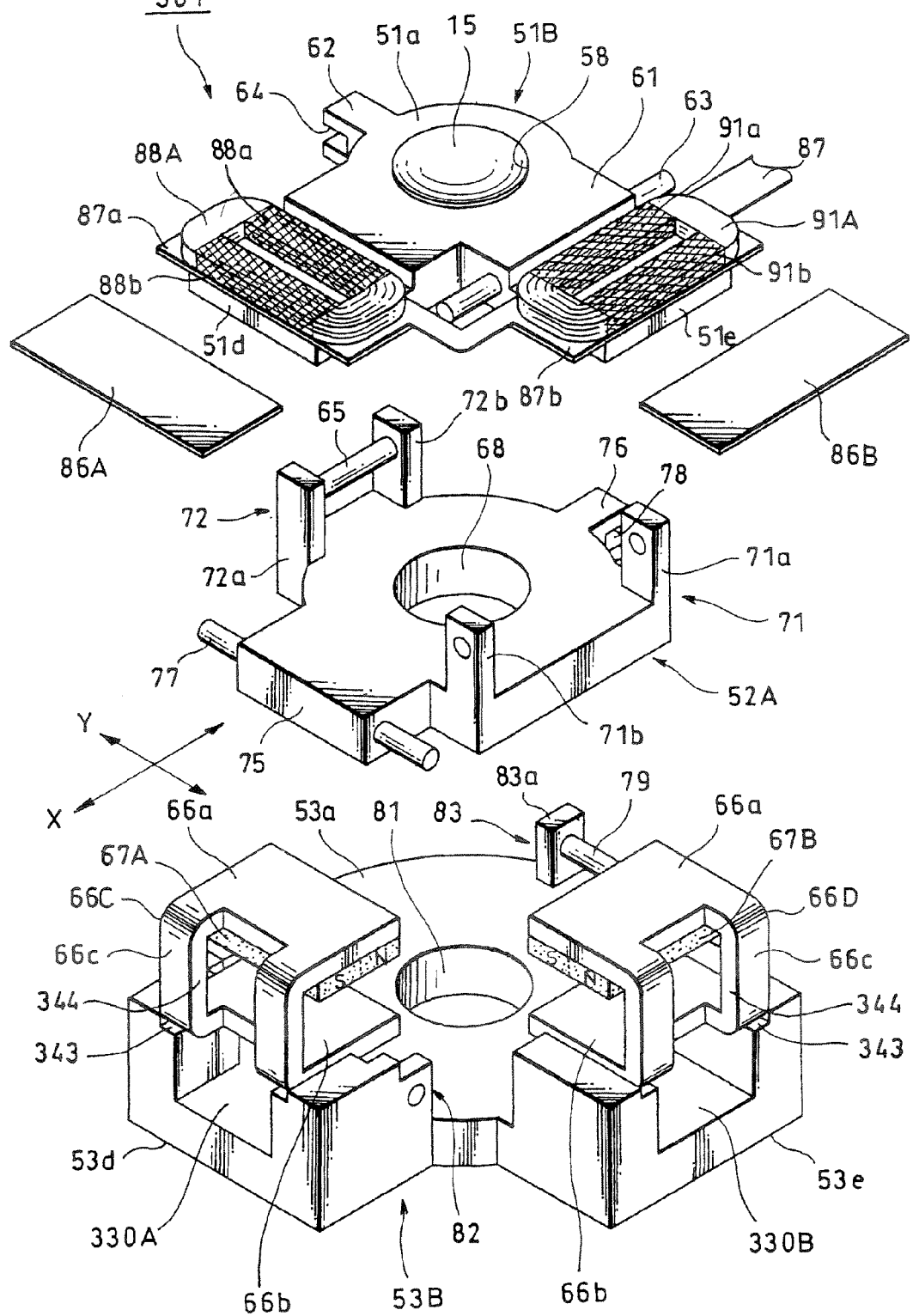
FIG. 6 is an exploded perspective view showing an image stabilizer of a moving coil system, which is an image stabilizer according to a second embodiment of the present invention.
Figure 7:
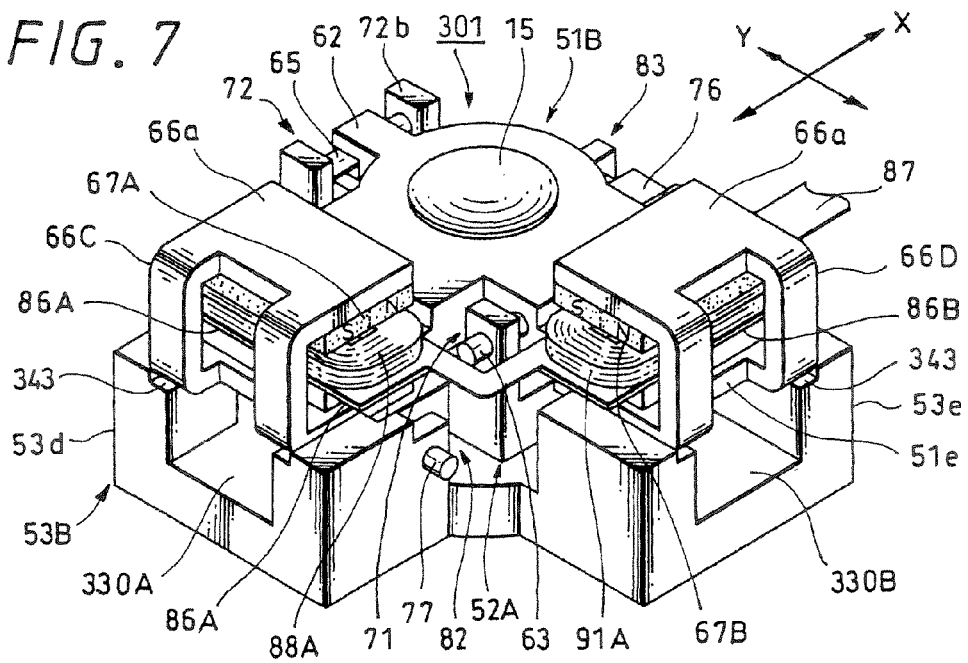
FIG. 7 is an external perspective view in which the image stabilizer in FIG. 6 has been assembled.
Figure 8:
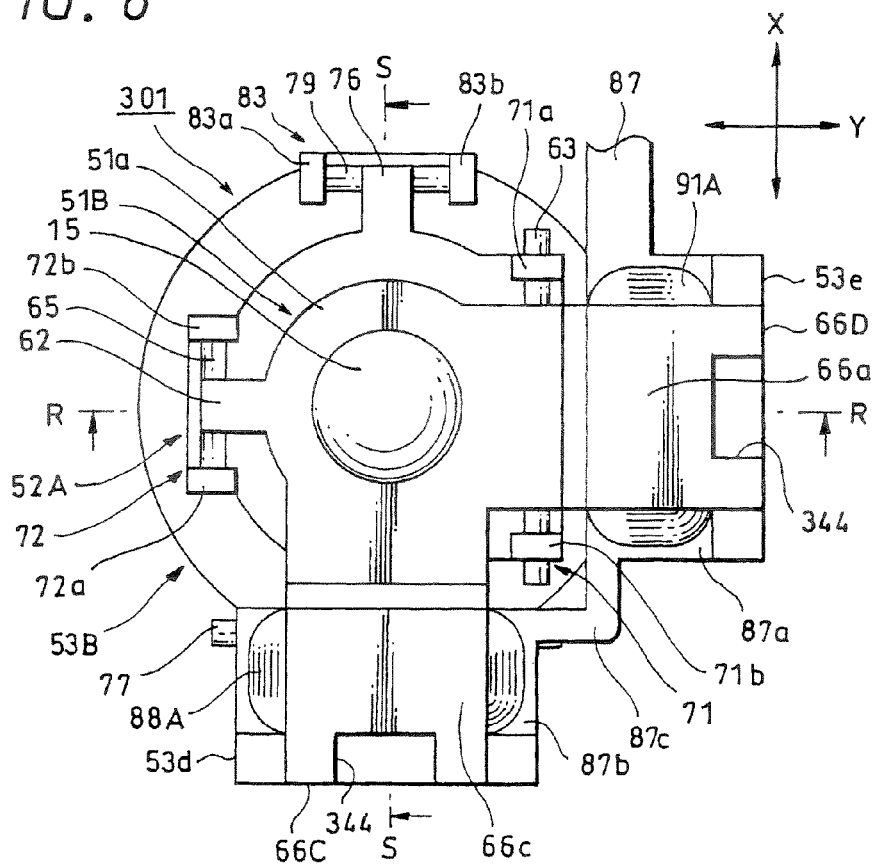
FIG. 8 is a plan view showing the image stabilizer in FIG. 7.
Figure 9A:
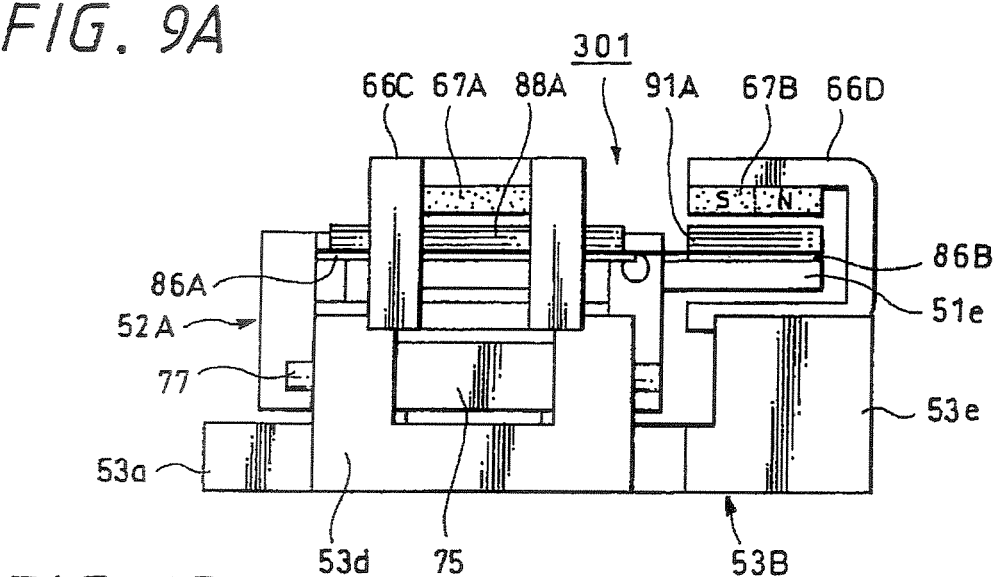
Figure 9B:
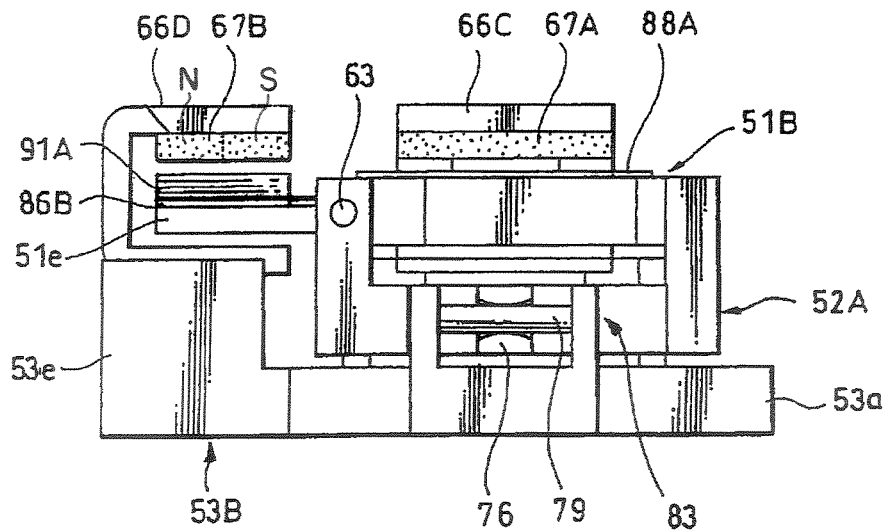
Figure 9C:
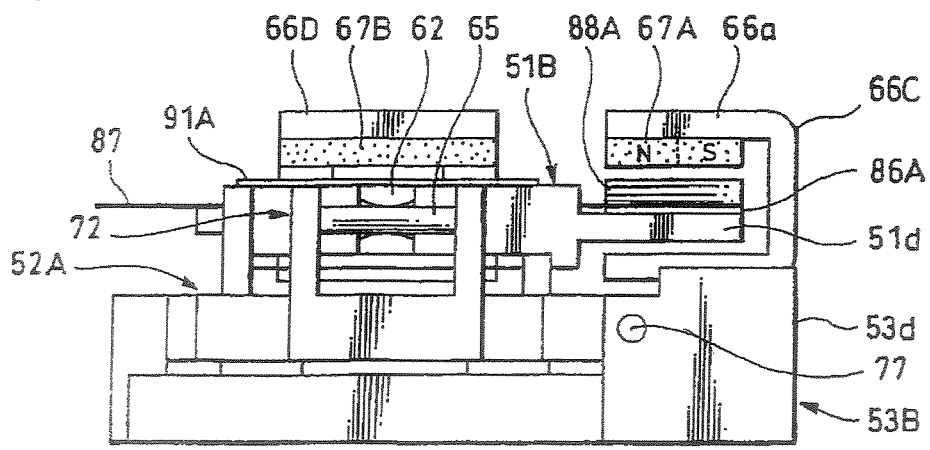

Embodiments of the present invention will be explained referring to the attached drawings. FIGS. 1 to 18 explain embodiments of the present invention. Specifically, FIGS. 1 to 5 show an image stabilizer including a driver of a moving magnet system according to a first embodiment of the present invention: FIG. 1 is an exploded perspective view; FIG. 2 is an assembled perspective view; FIG. 3 is a plan view; FIGS. 4A, 4B and 4C are a front view, a rear view and a left side view, respectively; and FIG. 5 is an explanatory diagram showing arrangement of position detectors. FIGS. 6 to 9 show an image stabilizer including a driver of a moving coil system according to a second embodiment of the present invention: FIG. 6 is an exploded perspective view; FIG. 7 is an assembled perspective view; FIG. 8 is a plan view; and FIGS. 9A, 9B and 9C are a front view, a rear view and a left side view, respectively.

Figure 10:
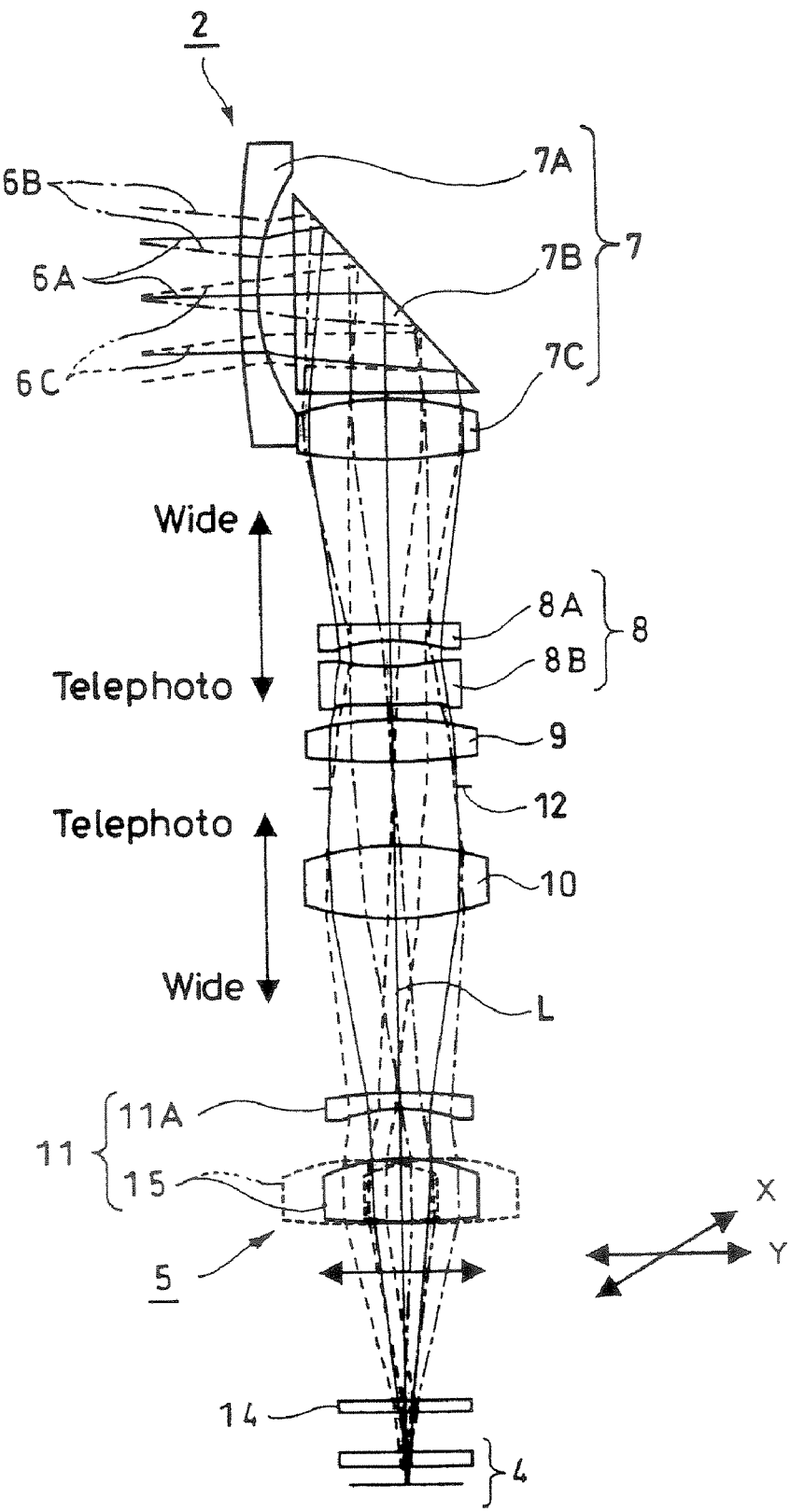
FIG. 10 is an explanatory diagram for explaining a first example of a lens system of a lens device according to an embodiment of the present invention.
Figure 12B:
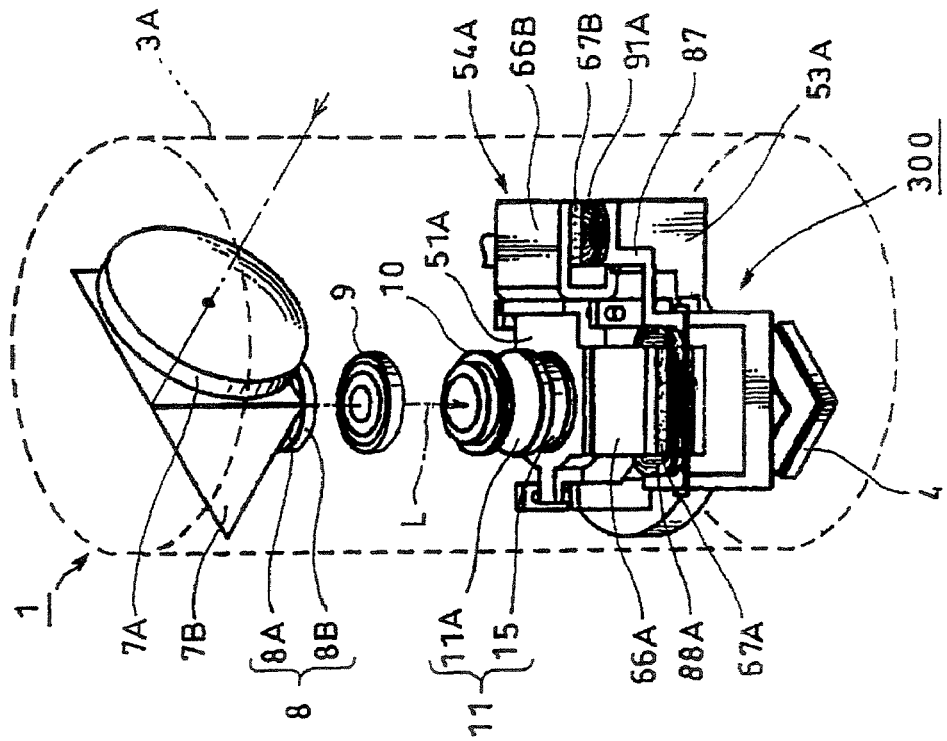
Figure 12A:
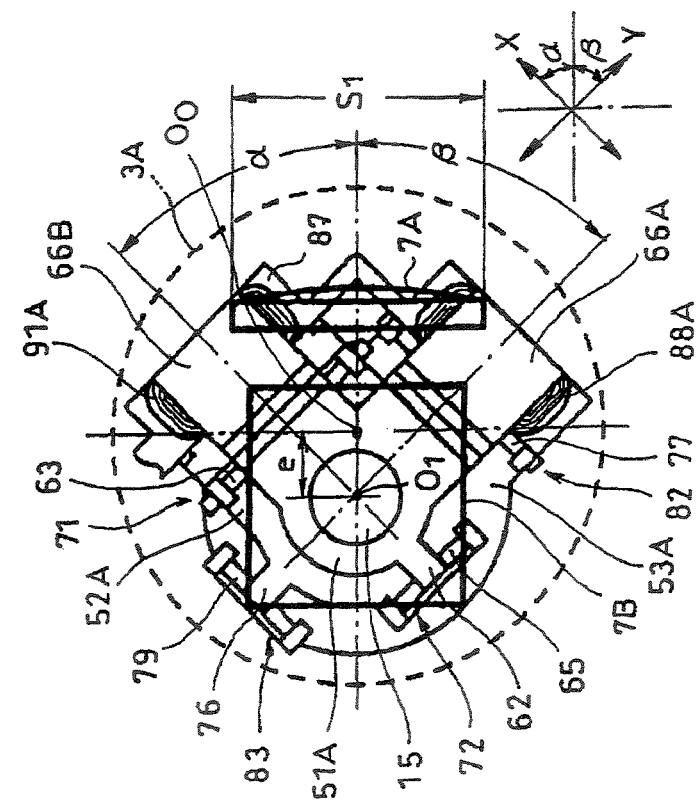
Figure 13:
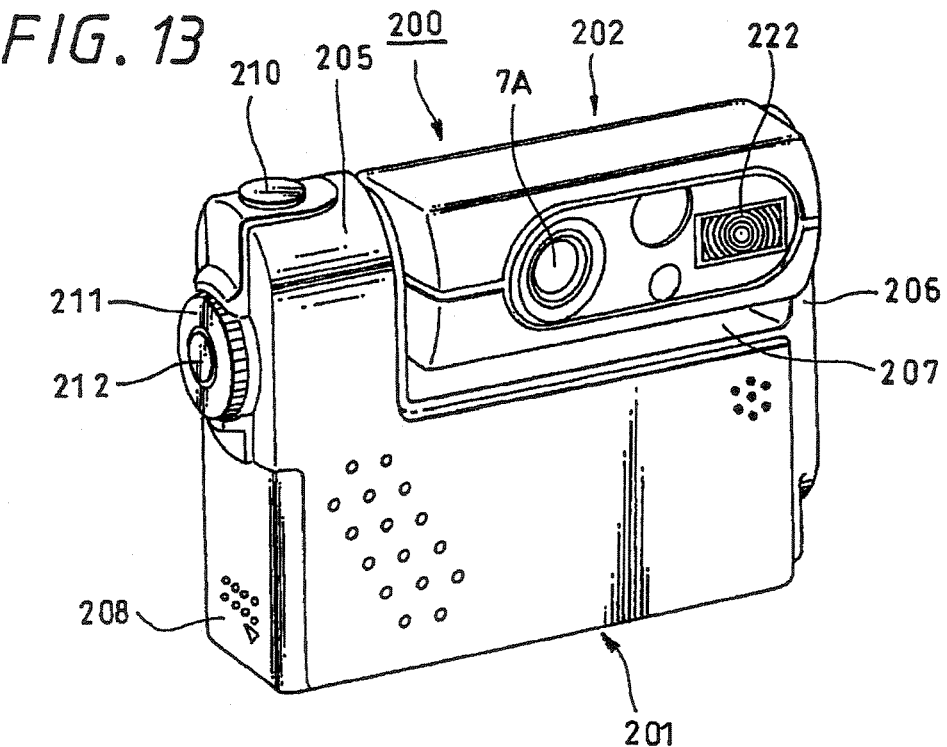
FIG. 13 is a perspective view of a digital still camera relating to an imager apparatus according to a first embodiment of the present invention, as seen from the front side.
Figure 14:
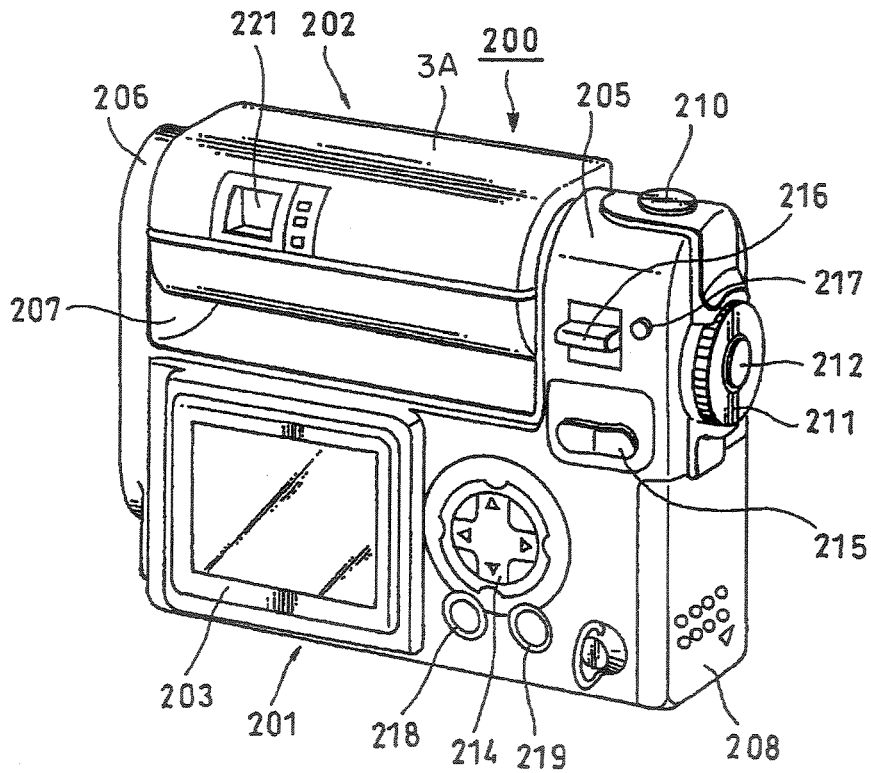
FIG. 14 is a perspective view of a digital still camera relating to an imager apparatus according to a first embodiment of the present invention, as seen from the rear side.
Figure 15:
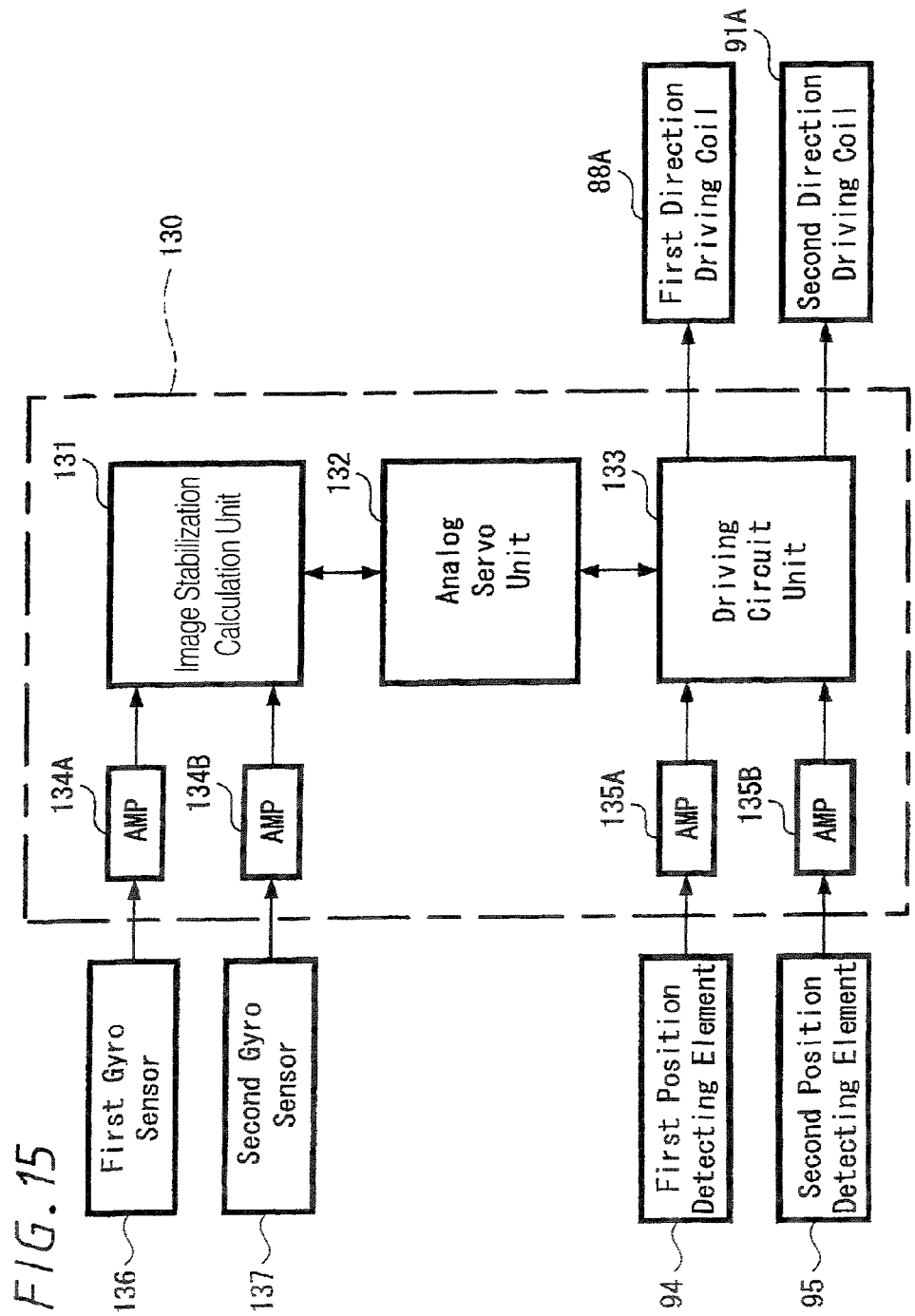
FIG. 15 is a block diagram for explaining a concept of the control by an image stabilizer according to an embodiment of the present invention.
Figure 16:
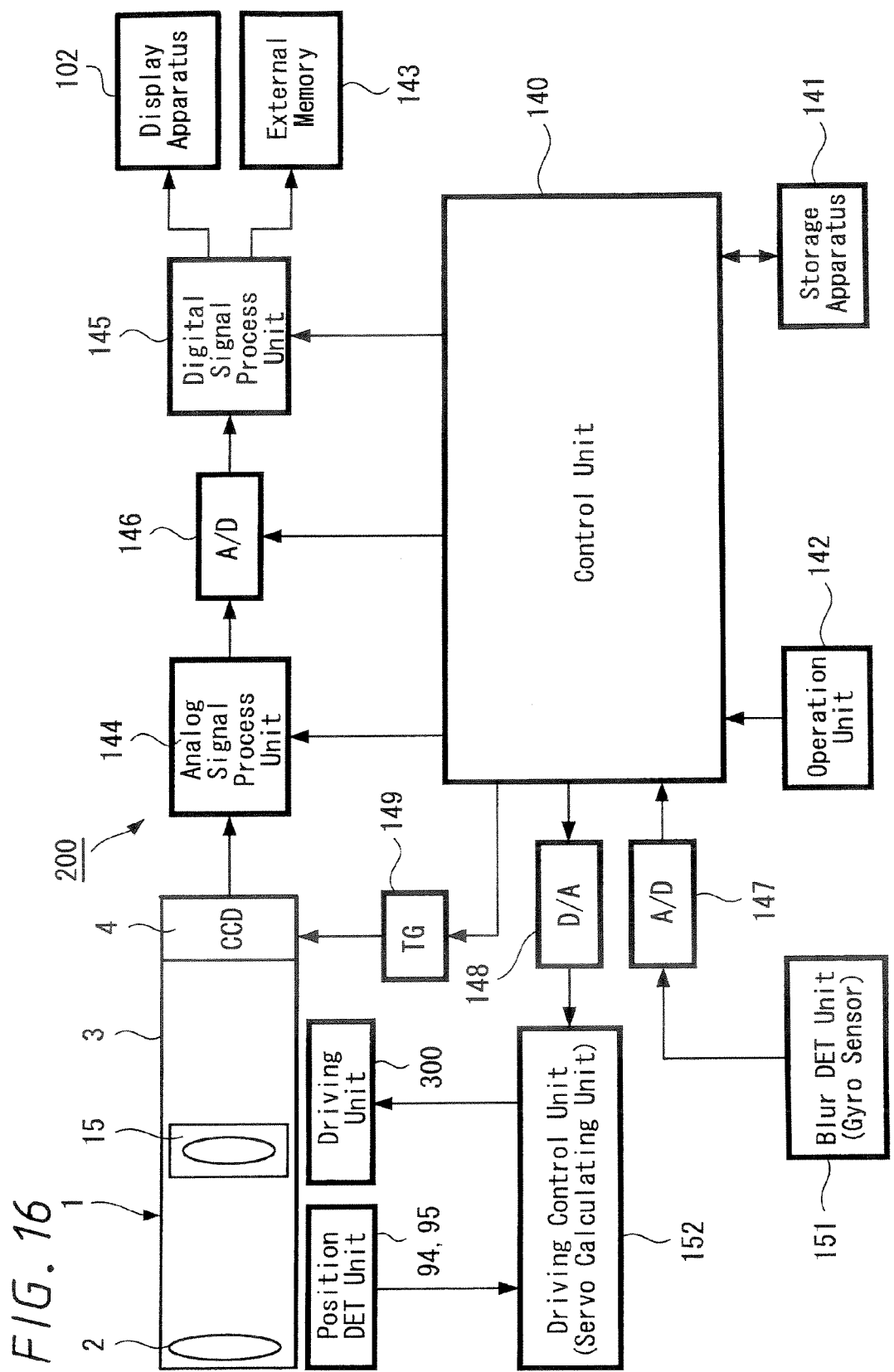
FIG. 16 is a block diagram showing a first practice example of a schematic configuration of an imager apparatus according to an embodiment of the present invention.
Figure 17:
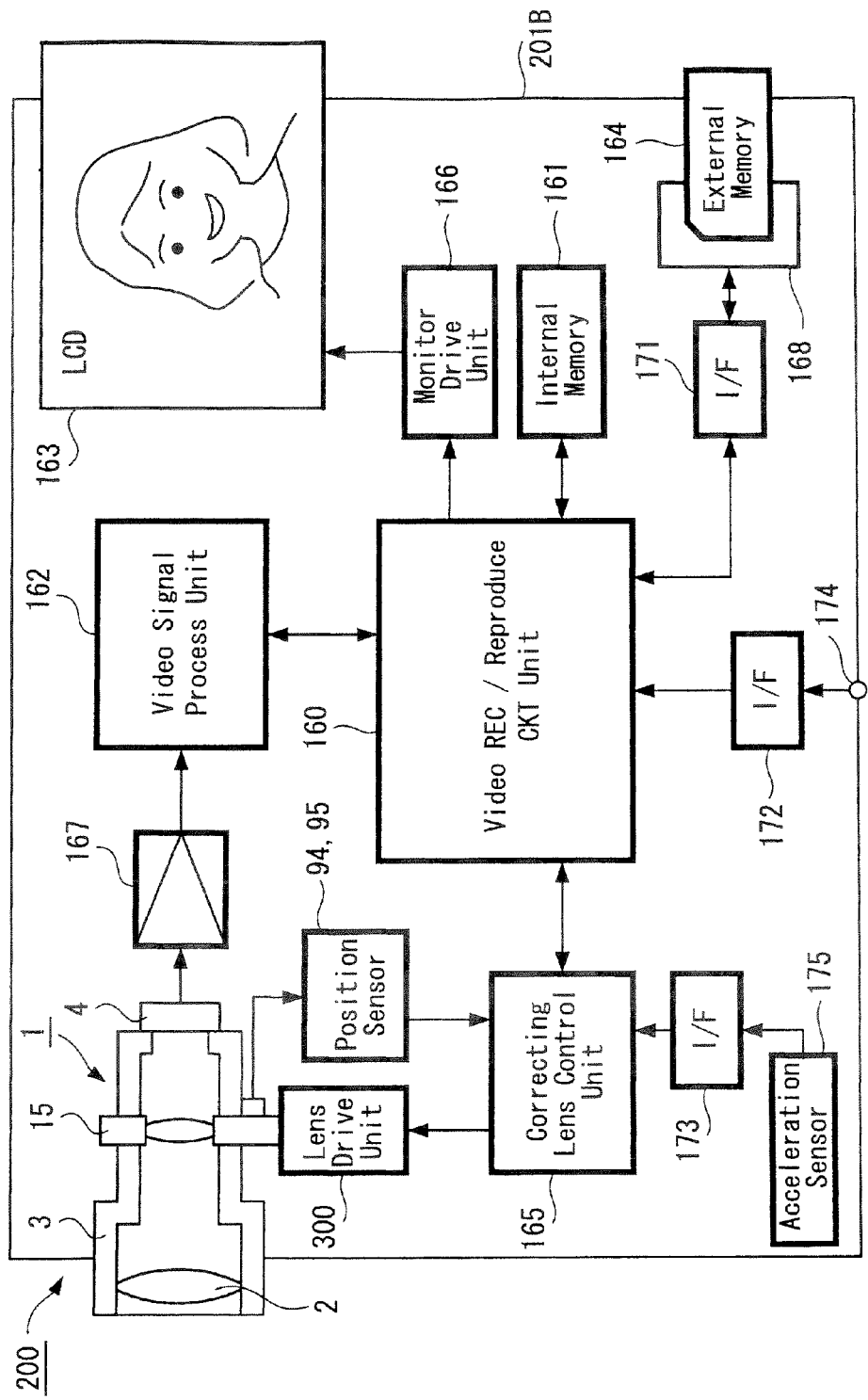
FIG. 17 is a block diagram showing a second practice example of a schematic configuration of an imager apparatus according to an embodiment of the present invention.
Figure 18A:
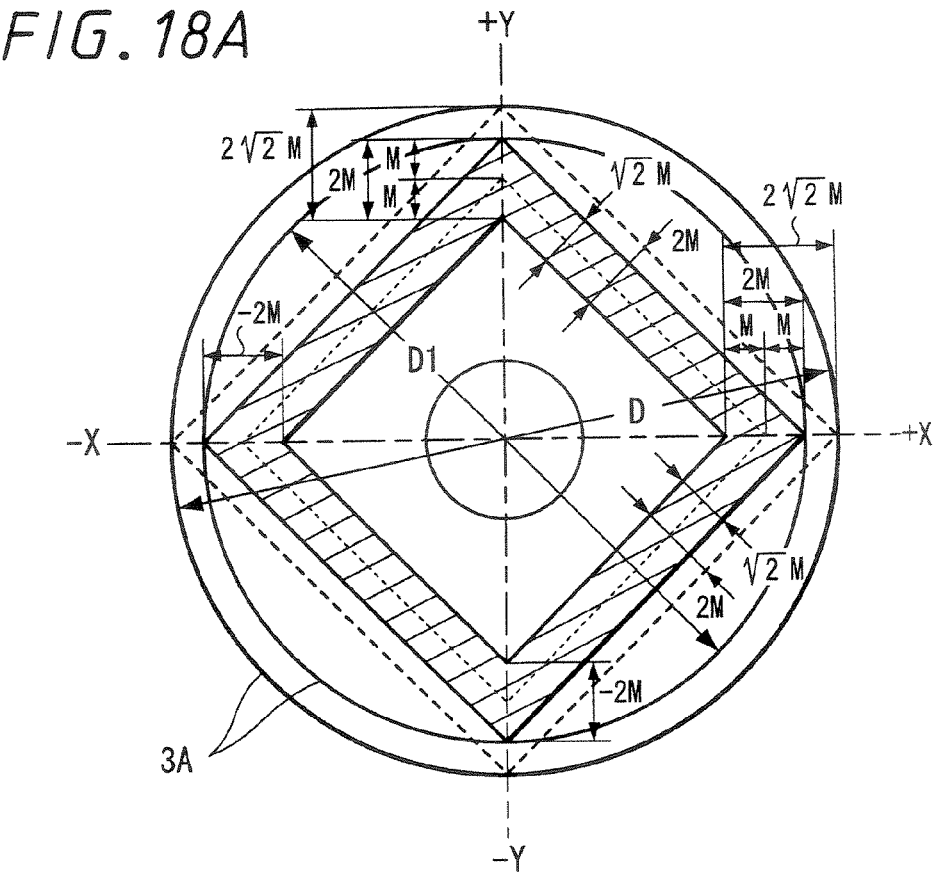
FIGS. 18A and 18B are explanatory diagrams for explaining moving region of a correcting lens relating to an image stabilizer according to an embodiment of the present invention.
Figure 18B:
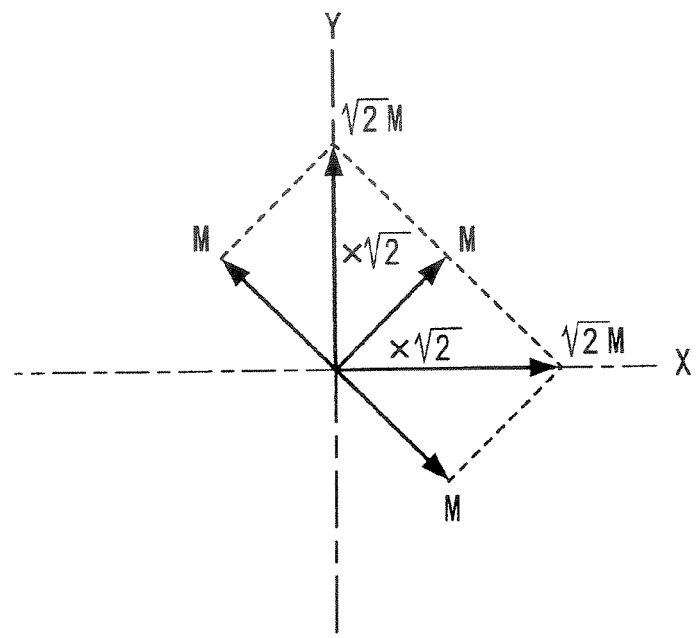

Further, FIGS. 10 to 12 explain a lens device according to a first embodiment of the present invention: FIG. 10 is an explanatory diagram of a lens system; FIGS. 11A and 11B are a front view and a left side view of a lens device including an image stabilizer of a moving magnet system, respectively; and similarly, FIGS. 12A and 12B are a plan view and a perspective view respectively. FIG. 13 is a perspective view of a digital still camera representing a first example of an imager apparatus according to an embodiment of the present invention, as seen from the front side; and similarly FIG. 14 is a perspective view of a digital still camera, as seen from the rear side. FIG. 15 is a block diagram for explaining the concept of the control by an image stabilizer according to an embodiment of the present invention; FIG. 16 is a block diagram showing a first practice example of the schematic configuration of an imager apparatus according to an embodiment of the present invention; and similarly FIG. 17 is a block diagram showing a second practice example of the schematic configuration of an imager apparatus. FIGS. 18A and 18B are explanatory diagrams for explaining the function of an image stabilizer according to an embodiment of the present invention, and for explaining a vector of operational force.

As shown in FIGS. 10 to 12, a lens device 1 representing a first embodiment of the present invention includes a lens system 2, a lens barrel 3A, a CCD (solid-state imaging device) 4, an image stabilizer 300 and the like. The lens system 2 has five group lenses in which a plurality of lenses are disposed on the same optical axis L. The lens barrel 3A supports the lenses of this lens system 2 in a fixed or movable manner. The CCD 4, representing a specific example of an imager, is arranged on the optical axis L of the lens system 2 and is fixed to the lens barrel 3A. The image stabilizer 300 is attached to the lens barrel 3A and stabilizes images of the lens system 2.

As shown in FIG. 10 and other figures, the lens system 2 in the lens device 1 includes a collapsible lens having a collapsible lens system formed of five group lenses 7 to 11 in which five lens groups are disposed on the same optical axis L. Of the five group lenses 7 to 11, the first-group lens 7 positioned at the front end includes: a first lens 7A which is an objective lens facing a subject; a prism 7B arranged on the side opposite to the subject regarding this objective lens 7A; and a second lens 7C which faces this prism 7B. The prism 7B is formed of a triangular prism whose cross section is shaped to be an isosceles right triangle; one of the two sides which are adjacent to each other and rotationally displaced by 90° is faced by the objective lens 7A, and the other side is faced by the second lens 7C.

As regards the first-group lens 7, light passing through the objective lens 7A enters the prism 7B from one surface. The light is then reflected on a reflecting surface inclined 45° regarding the optical axis L, and then is made to advance in a direction that is bent by 90°. Subsequently, the light passes through the second lens 7C after being emitted from the other side; and eventually advances toward a second-group lens 8 along the optical axis L. The second-group lens 8 is a combination of a third lens 8A and fourth lens 8B, and is constructed in such a manner as to be movable on the optical axis L. Light passing through the second-group lens 8 enters a third-group lens 9.

The third-group lens 9 is formed of a fifth lens fixed to the lens barrel 3A. Behind the third-group lens 9 is provided a fourth-group lens 10 formed of a sixth lens. Between the fourth-group lens 10 and the third-group lens 9 is provided an iris mechanism 12 capable of adjusting the amount of light which passes through the lens system 2. The fourth-group lens 10 is constructed in such a manner as to be movable on the optical axis L. Behind the fourth group lens 10 is provided a fifth-group lens 11 formed of a seventh lens 11A and of a correcting lens 15 described later on. Of the components of the fifth-group lens 11, the seventh lens 11A is fixed to the lens barrel 3A, the correcting lens 15 is provided behind this seventh lens 11A in a movable manner, and further, a CCD 4 is provided behind the correcting lens 15.

The second-group lens 8 and the fourth-group lens 10 are movable in the direction of the optical axis independently and separately along the optical axis L. By moving the second-group lens 8 and the fourth-group lens 10 in predetermined directions, zoom adjustment and focus adjustment can be performed. Specifically, at the time of zooming, by moving the second-group lens 8 and the fourth-group lens 10 from wide to telephoto, zoom adjustment is carried out. Also, at the time of focusing, by moving the fourth-group lens 10 from wide to telephoto, focus adjustment can be carried out.

The CCD 4 is fixed to a CCD adaptor and is attached to the lens barrel 3A by means of this CCD adaptor. In front of the CCD 4 is provided an optical filter 14, and between this optical filter 14 and the seventh lens 11A is provided the image stabilizer 300 having the correcting lens 15. The image stabilizer 300 that is later described in detail is for stabilizing picked-up images blurred by vibration of the lens system 2 or the like by the correcting lens 15. In its normal state, the correcting lens 15 is installed such that the optical axis thereof coincides with the optical axis L of the lens system 2. Then, when an image is blurred on the focusing plane of the CCD 4 owing to vibration of a camera or the like, the image blurring on the focusing plane is stabilized by the image stabilizer 300 which moves the correcting lens 15 in two directions (a first direction X and second direction Y) perpendicular to the optical axis L.

FIGS. 1 to 5 show an image stabilizer according to a first embodiment of the present invention. This first embodiment is an image stabilizer 300 including a driver of a moving magnet system. Further, FIGS. 6 to 9 show an image stabilizer according to a second embodiment of the present invention. This second embodiment is an image stabilizer 301 including a driver of a moving coil system.

The image stabilizer 300 explained as a first embodiment has a structure shown in FIGS. 1 to 4. This image stabilizer 300 includes: the above-mentioned correcting lens 15, a first moving frame 51A, a second moving frame 52A, a fixed base board 53A, an actuator 54A, position detectors (hall elements) 94 and 95, and the like. The first moving frame 51A supports the correcting lens 15. The second moving frame 52A supports the first moving frame 51A in a movable manner in a first direction X perpendicular to the optical axis L of the lens system 2. The fixed base board 53A supports the second moving frame 52A in a movable manner in a second direction Y perpendicular to the optical axis L and perpendicular to the first direction X. The actuator 54A, representing a specific example of a driver, moves the first moving frame 51A in the first direction X and moves the second moving frame 52A in the second direction Y. The position detectors (hall elements) 94 and 95 detect the position of the correcting lens 15.

When the camera which will be described later on is shaken or vibrated by camera shake or the like, the correcting lens 15 stabilizes blurred image by its position being moved in the first direction X and/or in the second direction Y corresponding to the amount of image blurring at that time. The first moving frame 51A holding the correcting lens 15 has a ring-shaped lens fixed portion 51a and two yoke fixed portions 51b and 51c integrally installed therewith. At the center of the lens fixed portion 51a is provided a fitting hole 58 in which the correcting lens 15 is fitted and fixed by a fastening mechanism such as adhesive. Further, the two yoke fixed portions 51b and 51c are positioned on the outside of the lens fixed portion 51a rotationally shifted from each other approximately by 90° in the radial direction.

The second yoke fixed portion 51c in the first moving frame 51A constitutes a first main bearing portion 61. Further, a first sub bearing portion 62 is provided on the opposite side of the lens fixed portion 51a with the correcting lens 15 in between. A first main guide shaft 63 penetrates the first main bearing portion 61 in a horizontal direction, and the first main guide shaft 63 is pressed and fixed to the first main bearing portion 61 in the middle portion thereof. Further, the first sub bearing portion 62 is provided with a bearing groove 64 opened on the side thereof, and a first sub guide shaft 65 is engaged with the bearing groove 64 in a freely slidable manner.

A first yoke 66A and second yoke 66B constituting a magnetic path are integrally fixed to the first yoke fixed portion 51b and second yoke fixed portion 51c, respectively. The first yoke 66A and the second yoke 66B are U-shaped in a similar manner. Each of the yokes 66A and 66B is attached to the first moving frame 51A with two pieces 66a and 66b opposed to each other being arranged in a vertical direction, and with a joint piece 66c, which joins the upper and lower pieces 66a and 66b vertically opposed to each other, being fixed to the yoke fixed portion 51b and 51c by a fastening mechanism such as adhesive.

The upper and lower pieces 66a and 66b in each of the first and second yokes 66A and 66B are both rectangular in shape, and magnets 67A and 67B formed of rectangular boards are integrally fixed to the inner surfaces of the upper pieces 66a and 66a by a fastening mechanism such as adhesive. The magnets 67A and 67B are constructed such that polarity differs in the widthwise direction; in this embodiment, regarding the first magnet 67A, the north pole is set on the inside near the correcting lens 15, whereas regarding the second magnet 67B, the south pole is set on the inside. However, polarities of the first and second magnets 67A and 67B may be arranged in the opposite manner to this embodiment; in addition, it should be appreciated that both the magnets may have their north poles on the inside or have their south poles on the inside.

It should be noted that the first and second magnets 67A and 67B are arranged on the upper and lower sides regarding the upper and lower pieces 66a and 66b of the yokes 66A and 66B respectively, and are fixed to the inner surface of the respective pieces 66a and 66b. However, a structure including magnets fixed only to the upper pieces 66a (or to the lower pieces 66b as an alternative) as shown in this embodiment enables the whole of the image stabilizer 300 to be thin.

The second moving frame 52A is formed to be a perforated member whose plane is ring-shaped, and the fitting hole 58 of the first moving frame 51A is opposed to a through-hole 68 at the center thereof. On one side of the second moving frame 52A with respect to one diametral direction is provided a second main bearing portion 71 including two bearing pieces 71a and 71b protruding upward. In the end portions of the two bearing pieces 71a and 71b are provided bearing holes 71c which penetrate laterally. In the bearing holes 71c, protruding parts at both ends of the first main guide shaft 63 fixed to the first moving frame 51A are inserted in a freely slidable manner and are supported in a freely turnable manner.

Further, on the opposite side to the second main bearing portion 71 of the second moving frame 52A is provided a second sub bearing portion 72 including two bearing pieces 72a and 72b protruding upward. Both ends of the first sub guide shaft 65 are supported by the two bearing pieces 72a and 72b. A direction in which the first sub guide shaft 65 supported by the second sub bearing portion 72 extends is designated as a first direction X in this embodiment. A third main bearing portion 75 is provided on one side of the second moving frame 52A, and a third sub bearing portion 76 is provided on the opposite side thereto with the through-hole 68 in between, in a direction perpendicular to this first direction X. A second main guide shaft 77 penetrates the third main bearing portion 75, and the second main guide shaft 77 is pressed and fixed to the third main bearing portion 75 in the middle portion thereof. Further, the third sub bearing portion 76 is provided with a bearing groove 78 opened on the side thereof, and a second sub guide shaft 79 engages with the bearing groove 78 in a freely slidable manner.

The fixed base board 53A has a ring-shaped base portion 53a and two coil supporting portions 53b and 53c integrally installed therewith and is shaped corresponding to the first moving frame 51A. The two coil supporting portions 53b and 53c are positioned on the outside of the base portion 53a rotationally shifted from each other approximately by 90° in the radial direction. A through-hole 81 is provided at the center of the base portion 53a. The through-hole 81 is arranged to be approximately concentric with the fitting hole 58 of the first moving frame 51A and the through-hole 68 of the second moving frame 52A.

The two coil supporting portions 53b and 53c in the fixed base board 53A have two supporting pieces 341a and 341b respectively, provided at a predetermined interval in a tangential direction to the base portion 53a and protruding upward. The two supporting pieces 341a and 341b of the coil supporting portion 53b on one side constitute a fourth main bearing portion 82, and the supporting pieces 341a and 341b are each provided with a bearing hole 342. Further, a fourth sub bearing portion 83 including two bearing pieces 83a and 83b is provided at a peripheral portion of the base portion 53a in the fixed base board 53A on the opposite side to the first coil supporting portion 53b with the through-hole 81 in between.

In the bearing holes 342 of the two supporting pieces 341a and 341b in the fourth main bearing portion 82, the protruding portions at both ends of the second main guide shaft 77 of the second moving frame 52A are inserted in a freely slidable manner and are supported in a freely turnable manner. Further, both ends of the second sub guide shaft 79 are fixed to the two bearing pieces 83a and 83b in the fourth sub bearing portion 83 and are thus supported. In this embodiment, the axial direction of the first main guide shaft 63 and first sub guide shaft 65 is designated as a first direction X, and the axial direction of the second main guide shaft 77 and second sub guide shaft 79 extending perpendicularly thereto is designated as a second direction Y.

Between the lower piece 66b of the first yoke 66A fixed to the first moving frame 51A and the first magnet 67A are provided a magnetic plate 86A, a first coil mounting portion 87a and a first coil 88A, which are fixed to the first coil supporting portion 53b of the fixed base board 53A, in a noncontact state. Further, between the lower piece 66b of the second yoke 66B fixed to the first moving frame 51A and the second magnet 67B are provided a magnetic plate 86B, a second coil mounting portion 87b and a second coil 91A, which are fixed to the second coil supporting portion 53c of the fixed base board 53A, in a noncontact state.

Further, regarding the coil supporting portions 53b and 53c, the magnetic plates 86A and 86B formed of a magnetic material being thin plates are each provided between the two supporting pieces 341a and 341b like a bridge. The magnetic plates 86A and 86B are fixed to the coil supporting portions 53b and 53c respectively by a fastening mechanism such as adhesive. A flexible printed circuit board 87 is mounted on these magnetic plates 86A and 86B.

The two magnetic plates 86A and 86B relatively attract the first moving frame 51A and the second moving frame 52A as well as the second moving frame 52A and the fixed base board 53A by being attracted by the magnetic force of the magnets 67A and 67B. Thus, the two magnetic plates have the main function of removing looseness generated between the first moving frame 51A and the second moving frame 52A and a looseness generated between the second moving frame 52A and the fixed base board 53A. In addition, the magnetic plates 86A and 86B have the function of reinforcing the strength of the flexible printed circuit board 87. As a material for the magnetic plates 86A and 86B, a variety of materials such as iron, nickel, cobalt, alloys thereof and so forth are applicable as long as they are attracted by the magnets.

The flexible printed circuit board 87 has the first coil mounting portion 87*a* and second coil mounting portion 87*b* which are approximately similar to the magnetic plates 86A and 86B in size; and both the coil mounting portions 87*a* and 87*b* are joined by a joint portion 87*c*, forming a single unit. The first coil mounting portion 87*a* and second coil mounting portion 87*b* are disposed to overlap with the two magnetic plates 86A and 86B fixed to the two coil supporting portions 53*b* and 53*c* in the fixed base board 53A. The first coil 88A is mounted on the first coil mounting portion 87*a* and the second coil 91A is mounted on the second coil mounting portion 87*b*, both of which are fixed by a fastening mechanism such as adhesive.

Formed of levelly-wound flat coils having an approximately elliptical shape, the first coil 88A and second coil 91A are both electrically connected to predetermined wiring patterns provided on the upper surfaces of the coil mounting portions 87*a* and 87*b* of the flexible printed circuit board 87. The first coil 88A and second coil 91A are each formed by winding one coil wire. Regarding each of the coils 88A and 91A, the two linear portions on the lengthwise side which are opposed to each other in the widthwise direction are thrust-generating portions 88*a* and 88*b* and thrust-generating portions 91*a* and 91*b* generating thrust as actuators. The first coil 88A is arranged with the thrust-generating portions 88*a* and 88*b* extending in a direction perpendicular to the first direction X, whereas the second coil 91A is arranged with the thrust-generating portions 91*a* and 91*b* extending in a direction perpendicular to the second direction Y.

After being assembled, the thrust-generating portion 88*a* on the inside of the first coil 88A is opposed to a magnetic pole portion on the inside of the first magnet 67A (the north pole in this embodiment), and the thrust-generating portion 88*b* on the outside of the first coil 88A is opposed to a magnetic pole portion on the outside of the first magnet 67A (the south pole in this embodiment). Also, the thrust-generating portion 91*a* on the inside of the second coil 91A is opposed to a magnetic pole portion on the inside of the second magnet 67B (the south pole in this embodiment), and the thrust-generating portion 91*b* on the outside of the second coil 91A is opposed to a magnetic pole portion on the outside of the second magnet 67B (the north pole in this embodiment).

The first coil 88A, the first magnet 67A and the first yoke 66A, which have been mentioned above, constitute a first electric actuator that is a first driver for moving the correcting lens 15 in the first direction X by means of the first moving frame 51A. The first main and sub bearing portions 61 and 62 of the first moving frame 51A, the first main and sub guide shafts 63 and 65, and the second main and sub bearing portions 71 and 72 constitute a first guide which guides the correcting lens 15 in the first direction X perpendicular to the optical axis L of the lens system 2 by means of the first moving frame 51A.

Further, the second coil 91A, the second magnet 67B and the second yoke 66B constitute a second electric actuator that is a second driver for moving the correcting lens 15 in the second direction Y by means of the second moving frame 52A. The third main and sub bearing portions 75 and 76 of the second moving frame 52A, the second main and sub guide shafts 77 and 79, and the fourth main and sub bearing portions 82 and 83 constitute a second guide which guides the correcting lens 15 in the second direction Y perpendicular to the optical axis L of the lens system 2 and perpendicular to the first direction X by means of the second moving frame 52A.

Thus, when an electric current is applied to the first coil 88A or second coil 91A, magnetic force generated by the first magnet 67A or second magnet 67B acts in a direction perpendicular to the coil 88A or 91A. Therefore, thrust which advances in the first direction X is generated in the first actuator and thrust which advances in the second direction Y is generated in the second actuator according to Fleming's left-hand rule.

In this regard, in the first coil 88A (in the second coil 91A as well), there are two thrust-generating portions 88*a* and 88*b* (91*a* and 91*b*) formed of linear portions generating thrust, and electric currents flow in opposite directions in the two portions. However, magnetic force of the first magnet 67A in opposite directions acts on the thrust-generating portions 88*a* and 88*b* (91*a* and 91*b*). Therefore, thrust generated in the two thrust-generating portions 88*a* and 88*b* (91*a* and 91*b*) is directed in the same direction if viewed as a whole coil, and the combined force of the thrust becomes the thrust by the first actuator (second actuator as well), thereby acting as the force which moves the correcting lens 15 in the first direction X that is the predetermined direction (the second direction Y in the case of the second actuator).

It should be noted that the two bearing pieces 71*a* and 71*b* of the second main bearing portion 71 are formed apart from each other by the distance obtained by adding the length necessary for the first moving frame 51A to move in the first direction X to the length of the first main bearing portion 61 in the first direction X. Hence, the first moving frame 51A is capable of moving in the first direction X by the distance obtained by subtracting the length of the first main bearing portion 61 from the distance between the two bearing pieces 71*a* and 71*b*. Also, the two supporting pieces 341*a* and 341*b* of the fourth main bearing portion 82 are formed apart from each other by the distance obtained by adding the length necessary for the second moving frame 52A to move in the second direction Y to the length of the third main bearing portion 75 in the second direction Y. Hence, the second moving frame 52A is capable of moving in the second direction Y by the distance obtained by subtracting the length of the third main bearing portion 75 from the distance between the two supporting pieces 341*a* and 341*b*.

Also, in this embodiment, the magnetic plates 86A and 86B are attached to the coil supporting portions 53*b* and 53*c* of the fixed base board 53A, and the coil supporting portions 53*b* and 53*c* having those magnetic plates 86A and 86B are arranged between the upper and lower pieces 66*a* and 66*b* of the yokes 66A and 66B. Therefore, by attracting the magnetic plates 86A and 86B to the magnets 67A and 67B, looseness caused between the first moving frame 51A and the second moving frame 52A and looseness caused between the second moving frame 52A and the fixed base board 53A can be removed. Thus, since the first moving frame 51A and the second moving frame 52A can be moved relatively and the second moving frame 52A and the fixed base board 53A can be moved relatively without looseness, movement of the correcting lens 15 can be controlled accurately and smoothly.

Specifically, the first moving frame 51A and the second moving frame 52A are joined and supported in a movable manner by the first bearing portions and the second bearing portions, and the second moving frame 52A and the fixed base board 53A are joined and supported in a movable manner by the third bearing portions and the fourth bearing portions. Each of the first to fourth bearing portions includes a shaft and bearing portion thereof, and in order to secure sliding motion regarding each bearing portion, there needs to be space (looseness) between the shaft and bearing portion. As a result, there is a problem in which looseness is inevitably generated due to the space, and the looseness makes it difficult to control the movement of the correcting lens 15 accurately, however, in this embodiment, such a problem can be solved.

Further, in order to drive and control the correcting lens 15, it is preferable to provide a position detector which detects the position of the correcting lens 15. As the position detector, hall elements which detect the magnetic force of the magnets 67A and 67B can be used, for example. FIGS. 5A to 5C show an embodiment in which the position of the magnet 67A (or 67B) is detected by using the two hall elements 94 and 95. In this embodiment, with the polar border between the north and south poles in each of the magnets 67A and 67B being the center, magnetic force on the north pole side and that on the south pole side are detected to specify the position thereof. Further, the position detection is performed in two places, enabling the position of the correcting lens 15 to be detected with the first moving frame 51A.

The first hall element 94 is mounted on the upper surface of the first coil mounting portion 87a of the flexible printed circuit board 87 installed on the first magnetic plate 86A fixed to the first coil supporting portion 53b of the fixed base board 53A. The second hall element 95 is mounted on the upper surface of the second coil mounting portion 87b of the flexible printed circuit board 87 installed on the second magnetic plate 86B fixed to the second coil supporting portion 53c of the fixed base board 53A. Further, of the pair of magnets 67A and 67B, the first magnet 67A is fastened to the inner surface of the lower piece 66b of the first yoke 66A fixed to the first yoke fixed portion 51b of the first moving frame 51A, and the second magnet 67B is fastened to the inner surface of the lower piece 66b of the second yoke 66B fixed to the second yoke fixed portion 51c of the first moving frame 51A.

Each of the first magnet 67A and second magnet 67B is formed of a rectangular flat board and is polarized to have the north and south poles such that the magnet is divided in two in the widthwise direction. The first hall element 94 and second hall element 95 are each positioned so that the central part thereof is positioned on the polar border set at each center of the magnets 67A and 67B. By detecting the magnetic force of the north and south poles of the magnets 67A and 67B with the hall elements 94 and 95, the position of the correcting lens 15 can be detected through the position of the first moving frame 51A. With a control device calculating the position of the correcting lens 15 based upon signals detected from the hall elements 94 and 95, the correcting lens 15 can be driven and controlled accurately.

Also, although not shown in the drawings, it is preferable to provide a temperature detector detecting the temperature in the vicinity of the actuator 54A, and when the ambient temperature is a predetermined value or more, temperature correction is performed in addition to stabilizing images blurred by camera shake, a vibration or the like. By adding temperature control in this manner, highly accurate position control can be performed regarding the correcting lens 15. As the temperature detector, a thermistor can be used, for example. It is preferable that the thermistor be installed on the flexible printed circuit board 87 to be used in the vicinity of the coils 88A and 91A, for example.

The image stabilizer 300 with the above-mentioned structure can, for example, be assembled as follows. First, as shown in FIG. 1, the first and second magnetic plates 86A and 86B are fixed to one surface of the first and second coil mounting portions 87a and 87b in the flexible printed circuit board 87, and the first and second coils 88A and 91A are mounted on the surface of the opposite side. Thus, a coil assembly is provided in which the two magnetic plates 86A and 86B, the flexible printed circuit board 87 and the two coils 88A and 91A are integrated. The two magnetic plates 86A and 86B of this coil assembly are installed on the two coil supporting portions 53b and 53c in the fixed base board 53A to be fixed.

Next, the second moving frame 52A is placed facing the base portion 53a of the fixed base board 53A from above, and the bearing groove 78 provided in the third sub bearing portion 76 of the second moving frame 52A is engaged in a freely slidable manner with the second sub guide shaft 79 fixed and supported between the two bearing pieces 83a and 83b of the fourth sub bearing portion 83. Further, the third main bearing portion 75 of the second moving frame 52A is positioned between the two supporting pieces 341a and 341b of the fourth main bearing portion 82. Then, the second main guide shaft 77 is penetrated through the bearing holes 342 provided in the two supporting pieces 341a and 341b and through the through-hole in the third main bearing portion 75, and the protruding portions at both ends thereof are supported by the two supporting pieces 341a and 341b in a freely turnable manner and in a movable manner in the axial direction. Thus, the second moving frame 52A is supported with respect to the fixed base board 53A in a movable manner in a first direction that is one direction specified by a predetermined distance, namely by the amount obtained by subtracting the length of the third main bearing portion 75 from the distance between the inner surfaces of the two supporting pieces 341a and 341b of the fourth main bearing portion 82.

Next, the first and second yokes 66A and 66B to which the magnets 67A and 67B are fixed are fixed to the first moving frame 51A. The magnets 67A and 67B may be fixed to these yokes 66A and 66B after fixing the yokes 66A and 66B to the first moving frame 51A.

Subsequently, the first moving frame 51A is placed facing the second moving frame 52A from above, and the bearing groove 64 provided in the first sub bearing portion 62 of the first moving frame 51A is engaged in a freely slidable manner with the first sub guide shaft 65 fixed and supported between the two bearing pieces 72a and 72b of the second sub bearing portion 72. Further, the first main bearing portion 61 of the first moving frame 51A is positioned between the two bearing pieces 71a and 71b of the second main bearing portion 71. Then, the first main guide shaft 63 is penetrated through the bearing holes 71c provided in the two bearing pieces 71a and 71b and through the through-hole of the first main bearing portion 61. The protruding portions at both ends of the first main guide shaft 63 are supported by the two bearing pieces 71a and 71b in a freely turnable manner and in a movable manner in the axial direction. Thus, the first moving frame 51A is supported with respect to the second moving frame 52A in a movable manner in a first direction perpendicular to the second direction by a predetermined distance, namely, by an amount obtained by subtracting the length of the first main bearing portion 61 from the distance between the inner surfaces of the two bearing pieces 71a and 71b of the second main bearing portion 71.

In this regard, the first main guide shaft 63 protrudes from both ends of the first main bearing portion 61 with approximately the same length. Then, approximately the center of the first main guide shaft 63 is fixed and supported with the first main bearing portion 61 by means of press fitting or the like. Similarly, the second main guide shaft 77 protrudes from both ends of the third main bearing portion 75 with approximately the same length. Then, approximately the center of the second main guide shaft 77 is fixed and supported with the third main bearing portion 75 by means of press fitting or the like. Thus, assembly of the image stabilizer 300 is completed, and such image stabilizer 300 with a structure shown in FIGS. 2 to 4 is obtained.

Positions of the first moving frame 51A, the second moving frame 52A and the fixed base board 53A are determined by providing each member with a predetermined positioning hole to which a reference pin is inserted to determine the positions, for example. Accordingly, the first moving frame 51A and the second moving frame 52A are relatively fixed temporarily, and the second moving frame 52A and the fixed base board 53A are relatively fixed temporarily, resulting in the positions being adjusted easily and reliably.

The function of the image stabilizer 300 with the above-described structure is as follows, for example. The correcting lens 15 of this image stabilizer 300 is moved by selectively or simultaneously supplying a driving current of an appropriate value to the first coil 88A and the second coil 91A of the first and second actuators 54A via the flexible printed circuit board 87.

Specifically, the first coil 88A and second coil 91A of the image stabilizer 300 are fixed to the coil supporting portions 53b and 53c of the fixed base board 53A with the magnetic plates 86A and 86B and the flexible printed circuit board 87 placed in between. Hereupon, the thrust-generating portions 88a and 88b of the first coil 88A are extended in the second direction Y, and the thrust-generating portions 91a and 91b of the second coil 91A are extended in the first direction X. Further, the two magnets 67A and 67B fixed to the upper pieces 66a of the two yokes 66A and 66B fixed to the first moving frame 51A are arranged above the coils 88A and 91A.

As a result, the magnetic flux of a first magnetic circuit formed by the first yoke 66A and the first magnet 67A acts in such a manner as to penetrate through the thrust-generating portions 88a and 88b of the first coil 88A in the vertical direction. Similarly, the magnetic flux of a second magnetic circuit formed by the second yoke 66B and the second magnet 67B acts in such a manner as to penetrate through the thrust-generating portions 91a and 91b of the second coil 91A in the vertical direction. In this regard, the first and second coils 88A and 91A are fixed to the fixed base board 53A, whereas the first and second yokes 66A and 66B and the first and second magnets 67A and 67B are fixed to the first moving frame 51A which is supported in a movable manner in the first direction X and in the second direction Y within a predetermined range with respect to the fixed base board 53A, and the correcting lens 15 is held by the first moving frame 51A.

Thus, with the function of the first guide and second guide, the correcting lens 15 is capable of freely moving both in the first direction X and in the second direction Y within a pre-determined range. Furthermore, the two magnets 67A and 67B are attracted to (or repelled by) the two magnetic plates 86A and 86B due to the magnetic force thereof. As a result, looseness (space) between the first moving frame 51A and the second moving frame 52A and looseness (space) between the second moving frame 52A and the fixed base board 53A are absorbed, enabling a looseness-free state to be obtained at each joint portion. Accordingly, the movement of the correcting lens 15 can be controlled accurately and smoothly.

Upon applying an electric current to the first coil 88A (a similar function is obtained in the case of the second coil 91A as well), the electric current flows in the second direction Y in the thrust-generating portions 88a and 88b, since the thrust-generating portions 88a and 88b are extended in the second direction Y (in the first direction X in the case of the second coil 91A). In this regard, since the magnetic flux of the first magnetic circuit acts in a vertical direction perpendicular to the thrust-generating portions 88a and 88b, force directed in the first direction X (second direction Y in the case of the second coil 91A) acts on the first magnet 67A (second magnet 67B in the case of the second coil 91A) and the first yoke 66A (second yoke 66B in the case of the second coil 91A) according to Fleming's rule.

Thus, the first moving frame 51A to which the first yoke 66A is fixed moves in the first direction X. As a result, the correcting lens 15 held by the first moving frame 51A moves in the first direction X, being guided by the first guide, corresponding to the intensity of the electric current applied to the first coil 88A.

Also, if electric currents are simultaneously applied to the first coil 88A and the second coil 91A, the movement by the first coil 88A and the movement by the second coil 91A, both of which have been mentioned above, are conducted in a combined manner. Specifically, the correcting lens 15 moves in the first direction X due to the electric current which flows through the first coil 88A, and at the same time the correcting lens 15 moves in the second direction Y due to the electric current which flows through the second coil 91A. As a result, the correcting lens 15 moves in a diagonal direction, thereby stabilizing images of the lens system 2.

The image stabilizer 301 shown in FIGS. 6 to 9 represents a modified embodiment of the image stabilizer 300 shown in FIGS. 1 to 5, and is an image stabilizer with an electric actuator of a moving coil system. This image stabilizer 301 includes the two magnets 67A and 67B and the two coils 88A and 91A in the image stabilizer 300 shown in the aforementioned embodiment, however, the positions thereof are switched and the driver is constructed as a moving coil system. Regarding this image stabilizer 301, the same reference numerals are given to portions corresponding to those in the image stabilizer 300 and duplicate explanations thereof are omitted.

The image stabilizer 301 includes a first moving frame 51B, a second moving frame 52A and a fixed base board 53B. The first moving frame 51B has a ring-shaped lens-fixed portion 51a and two coil fixed portions 51d and 51e integrally provided therewith. The two coil fixed portions 51d and 51e are positioned on the outside of the lens fixed portion 51a in the radial direction, rotationally shifted from each other approximately by 90°. At the center of the lens fixed portion 51a is provided a fitting hole 58 in which a correcting lens 15 is fitted and fixed.

On the first coil fixed portion 51d is installed a first coil mounting portion 87a of a flexible printed circuit board 87, with a first magnetic plate 86A in between. Further, on the second coil fixed portion 51e is installed a second coil mounting portion 87b of the flexible printed circuit board 87, with a second magnetic plate 86B in between. Then, on the first and second coil mounting portions 87a and 87b are mounted first and second coils 88A and 91A, which are electrically connected to wiring patterns of the coil mounting portions 87a and 87b. It should be noted that the structure of the second moving frame 52A is similar to that in the aforementioned embodiment.

The structure of the fixed base board 53B is approximately similar to that of the aforementioned fixed base board 53A in external shape, however, the shape of the supporting portion is slightly different in order to fix first and second yokes 66C and 66D. Specifically, the upper surfaces of two yoke supporting portions 53d and 53e of the fixed base board 53B are provided with fitting grooves 343 into which lower pieces 66b of the yokes 66C and 66D are fitted. The lower pieces 66b are fitted into these fitting grooves 343, and the yokes 66C and 66D are fixed by a fastening mechanism such as adhesive. There is no modification in the basic form of the yokes 66C and 66D, however, joint portions 66c are provided with large opening holes 344 for weight reduction. The other structure is similar to that of the image stabilizer 300 shown in FIGS. 1 to 4.

In the second embodiment, also, the axial direction of a first main guide shaft 63 and first sub guide shaft 65 is designated as a first direction X, and the axial direction of a second main guide shaft 77 and second sub guide shaft 79 extending perpendicularly thereto is designated as a second direction Y, similarly to the aforementioned first embodiment. It should be appreciated that a first direction and a second direction may be set in the opposite manner also in this embodiment.

Further, between the lower piece 66b of the first yoke 66C fixed to the fixed base board 53B and a first magnet 67A are arranged: the first magnetic plate 86A, the first coil mounting portion 87a and the first coil 88A, which are fixed to the first coil fixed portion 51d of the first moving frame 51B, in a noncontact state. Further, between the lower piece 66b of the second yoke 66D fixed to the fixed base board 53B and a second magnet 67B are arranged: the second magnetic plate 86B, the second coil mounting portion 87b and the second coil 91A, which are fixed to the second coil fixed portion 51e of the first moving frame 51B, in a noncontact state.

Note that, in this embodiment, the first moving frame 51B and second moving frame 52A are forced away from the fixed base board 53B by attracting the first and second magnets 67A and 67B of the electric actuator to the first and second magnetic plates 86A and 86B. However, the first moving frame 51B and second moving frame 52A can be forced toward the fixed base board 53B, by repelling the first and second magnetic plates 86A and 86B with the first and second magnets 67A and 67B.

With such structure, looseness at a first bearing portion and a second bearing portion which join the first moving frame 51B and the second moving frame 52A can be removed, and looseness at a third bearing portion and a fourth bearing portion which join the second moving frame 52A and the fixed base board 53B can be removed. Thus, the first and second moving frames 51B and 52A which hold the correcting lens 15 can be moved smoothly, and also, the correcting lens 15 can be held in a constant posture. Therefore, deterioration in optical performance caused by a change in the posture of the correcting lens 15 can be prevented.

As shown in FIGS. 11A and 11B and FIGS. 12A and 12B, the image stabilizer 300, 301 with the aforementioned structures and functions is installed in a lens barrel 3A to constitute a lens device 1. This lens device 1 is a lens system in which a light path is bent by 90° by providing a first-group lens 7 with a prism 7B. By using this lens device 1, an imager apparatus with such an external appearance as shown in FIGS. 13 and 14 is constructed, for example.

Next, referring to FIG. 10, operation of the lens system 2 of the lens device 1 in which the image stabilizer 300 has been installed is explained. When the objective lens 7A of the lens system 2 is aimed at a subject, light from the subject is input from the objective lens 7A to the inside of the lens system 2. Then, light passing through the objective lens 7A is refracted by 90° in the prism 7B, and then advances toward the CCD 4 along the optical axis L of the lens system 2. Specifically, light reflected from the prism 7B and emitted from the second lens 7C of the first-group lens 7 passes through the second-group lens 8, the third-group lens 9 and the fourth-group lens 10, further passes through the seventh lens 11A and the correcting lens 15 of the fifth-group lens 11, and passes through the optical filter 14, thereby forming an image corresponding to the subject on the focusing screen of the CCD 4.

In this case, at the time of shooting, when camera shake and vibration are not applied to the lens device 1, light from the subject moves through each center portion of the first-group lenses 7 to fifth-group lenses 11 along the optical axis L as shown by the solid line of light 6A. Therefore, an image is formed at a predetermined position on the focal plane of the CCD 4, and an excellent image can be obtained without an image blur being caused.

On the other hand, at the time of shooting, when camera shake or vibration is applied to the lens device 1, light from the subject is input to the first-group lenses 7 in an inclined state as shown by the chain line of light 6B or shown by the broken line of light 6C. At each of the first-group to fifth-group lenses, the incident light 6B, 6C passes through the lenses, deviating from the optical axis L; however, it is possible to correct the camera shake or the like by moving the correcting lens 15 by a predetermined amount in accordance with the camera shake or the like. Accordingly, an image is formed at a predetermined position on the focal plane of the CCD 4, and an excellent image can be obtained by eliminating an image blur.

Camera shake, vibration or the like regarding the lens device 1 is detected by means of a blur detector. As this blur detector, a gyro sensor can be used, for example. This gyro sensor is installed in a camera body along with the lens device 1, and acceleration, angular velocity, angular acceleration and the like which act on the lens device 1 caused by a vibration, camera shake and the like of a photographer's hands are detected. Information detected by the gyro sensor, such as acceleration and angular velocity, is supplied to a control device, and the electric actuator 54A is driven and controlled such that the first moving frame 51A is moved in the first direction X in response to a shake in the first direction X, and the second moving frame 52A is moved in the second direction Y in response to a shake in the second direction Y, thus allowing an image to be formed at a predetermined position on the focal plane of the CCD 4.

FIGS. 13 and 14 show a digital still camera 200 that is a first practice example of an imager apparatus according to an embodiment of the present invention. This digital still camera 200 uses a semiconductor recording medium as an information recording medium, and an optical image from a subject is converted to an electric signal in a CCD (solid-state imaging device) to be recorded in the semiconductor recording medium and to be displayed on a display apparatus formed of a flat display panel, such as a liquid crystal display.

As shown in FIG. 13 and other figures, the digital still camera 200 includes an apparatus body 201 formed of a horizontally long casing, and a camera portion 202 supported in a turnable manner by this apparatus body 201. The camera portion 202 is provided with a lens device 1 which captures an image of a subject as light and leads it to a CCD 4 serving as an imager. Further, the apparatus body 201 is provided with: a display apparatus 203 such as a liquid crystal display which displays an image based upon an image signal output from the CCD 4; a control device which controls the action of the lens device 1, the display of the display apparatus 203 and the like; a battery power source and the like not shown in the drawings.

First and second prop portions 205 and 206 protruding upward are provided at both ends of the apparatus body 201 with respect to a lateral direction that is a lengthwise direction, and a lens system storage portion 207 for storing the camera portion 202 is formed inside the prop portions 205 and 206. Further, in the lower part of the apparatus body 201 on the side of the first prop portion 205, a battery storage portion and a memory storage portion are provided to be opened laterally. The battery storage portion and the like are freely opened and closed by an opening and closing lid 208 supported in a freely turnable manner by the apparatus body 201. In the battery storage portion, a battery power source such as a lithium secondary battery is stored in a detachable manner. Further, in the memory storage portion, an external storage apparatus of a semiconductor memory (a memory stick or the like, for example) is stored in a detachable manner.

A shutter button 210 for shooting is provided on the upper surface of the first prop portion 205 of the apparatus body 201. A mode selection dial 211 and a power switch 212 are arranged at the upper part on the side surface of the first prop portion 205. The mode selection dial 211 is ring-shaped, and the power switch 212 is stored in a hole thereof to be pushed and operated. The mode selection dial 211 is a rotary switch capable of selectively switching a mode among a still image shooting mode, a moving image shooting mode, a shot image reproducing/recording mode and the like, for example. Also, the power switch 212 is provided to switch on/off power supplied by the battery power source or the like.

As shown in FIG. 14, on the rear surface of the apparatus body 201 are arranged: a flat display panel (LCD) 203 that is a display apparatus; a control button 214; a zoom button 215; an operation stick 216 that is a direction selector; an auto horizontal button 217; and the like. On the side of the second prop portion 206 on the rear surface of the apparatus body 201, the flat display panel 203 is arranged for displaying a subject image corresponding to a subject, based upon an image signal supplied from the camera portion 202.

The control button 214 is provided for selecting items from a menu stored in a storage apparatus or the like incorporated in the apparatus body 201, and is arranged near the flat display panel 203. In relation thereto, a display switching button 218 for switching on/off the display of the flat display panel 203, and a menu switching button 219 for switching one display item to another on the menu are arranged in the lower part of the control button 214. The zoom button 215 is provided for continuously enlarging and reducing an image corresponding to a subject at the time of shooting and reproducing, and is arranged at the base part of the first prop portion 205. The operation stick 216 and the auto horizontal button 217 are arranged side by side above this zoom button 215.

The camera portion 202 is stored in the lens system storage portion 207 of the apparatus body 201 and is supported between the first and second prop portions 205 and 206 at both ends thereof in that state. Specifically, a lens barrel 3A is provided with cylindrical shaft portions which protrude to the outside from both ends in a cylindrical axis direction. With these cylindrical shaft portions being supported by bearings of the first and second prop portions 205 and 206 in a freely turnable manner, the camera portion 202 is supported by the apparatus body 201 in a freely turnable manner. The camera portion 202 includes: the lens barrel 3A formed of a casing having size and shape corresponding to the size and shape of the lens system storage portion 207, a lens system 2 stored in the lens barrel 3A, and the like.

Further, regarding the lens barrel 3A the front surface side where an objective lens 7A of the lens device 1 is arranged bulges, and the opposite side surface is arc-shaped. The thickness of the lens barrel 3A is approximately the same as that of the apparatus body 201, and the lens barrel 3A is formed to have an approximately flat surface as a whole, when the lens barrel 3A is attached to the apparatus body 201. Hereupon, the shape of the front surface, which is the bulged side of the lens barrel 3A corresponds to that of the lens system storage portion 207 of the apparatus body 201. Thus, if the camera portion 202 is turned, the front surface thereof protrudes from the surface of the apparatus body 201, and in that protruding state, the camera portion 202 can be turned by a predetermined angle (for example 300°). On the front surface of the lens barrel 3A is arranged the objective lens 7A of the lens device 1, and on the rear surface thereof is provided a finder 221. Further, on the front surface of the lens barrel 3A are provided a light-emitting portion 222 of a flash apparatus, and the like.

This camera portion 202 can be electrically turned by a barrel turner incorporated in the apparatus body 201. An electric motor, a gear row which transmits the power of the electric motor, and the like can be used to prepare a barrel turner, for example. In addition, it is preferable that a gravity sensor which senses the direction of gravity be incorporated in the apparatus body 201. An acceleration sensor, a gyro sensor and other devices capable of detecting the direction of gravity in a mechanical manner are applicable to this gravity sensor, for example. By detecting the direction of gravity with the gravity sensor, and controlling the posture of the camera portion 202 based on a detected signal thereof, the camera portion 202 can be faced constantly in a predetermined direction with respect to the gravitational direction.

FIGS. 11A and 11B and FIGS. 12A and 12B are provided to explain a state of the lens system 2 and the image stabilizer 300 of the lens device 1 being stored in the lens barrel 3A, in the case of a lens barrel of the camera portion 202 having a cylindrical shape. In the case of the image stabilizer 300 according to the embodiment, as is obvious from FIGS. 3 and 8, electric actuators for driving the correcting lens 15 in the first direction X and for driving that in the second direction Y are arranged in two places rotationally shifted from each other approximately by 90° in the circumferential direction of the first moving frame 51A or the like holding the correcting lens 15. Further, in the two places, part of the image stabilizer 300 is greatly protruding to the outside with respect to a radial direction.

Hereupon, the center (axial center line) of the lens barrel 3A is designated as $O_0$ and the center (optical axis) of the correcting lens 15 is designated as $O_1$, and the image stabilizer 300 is arranged in a hole of the lens barrel 3A such that the center $O_1$ of the correcting lens 15 corresponds with the center $O_0$ of the lens barrel 3A. In order to prevent the actuators of the image stabilizer 300 from being in contact with the inner surface of the hole of the lens barrel 3A, the diameter of the hole needs to be large. Then, in order to prevent the diameter of the hole of the lens barrel 3A from being made large, the center $O_1$ of the correcting lens 15 is deflected from the center $O_0$ of the lens barrel 3A in a direction inclined against the first direction X and second direction Y by an appropriate distance e. Hence, the image stabilizer 300 can be stored in a hole of a small diameter, as shown in FIG. 20A.

With the inclination angle $\alpha$ (or $\beta$) of the image stabilizer 300 with respect to the lens barrel 3A being 45° regarding the first direction X and second direction Y ($\alpha=\beta=45°$), the image stabilizer can be stored most efficiently in a hole of a small diameter. Here, the inclination angle $\alpha$ (or $\beta$) is an angle formed between the line, which connects the center $O_1$ of the correcting lens 15 and the center $O_0$ of the lens barrel 3A, and the first direction X (and second direction Y).

Figure 20A:
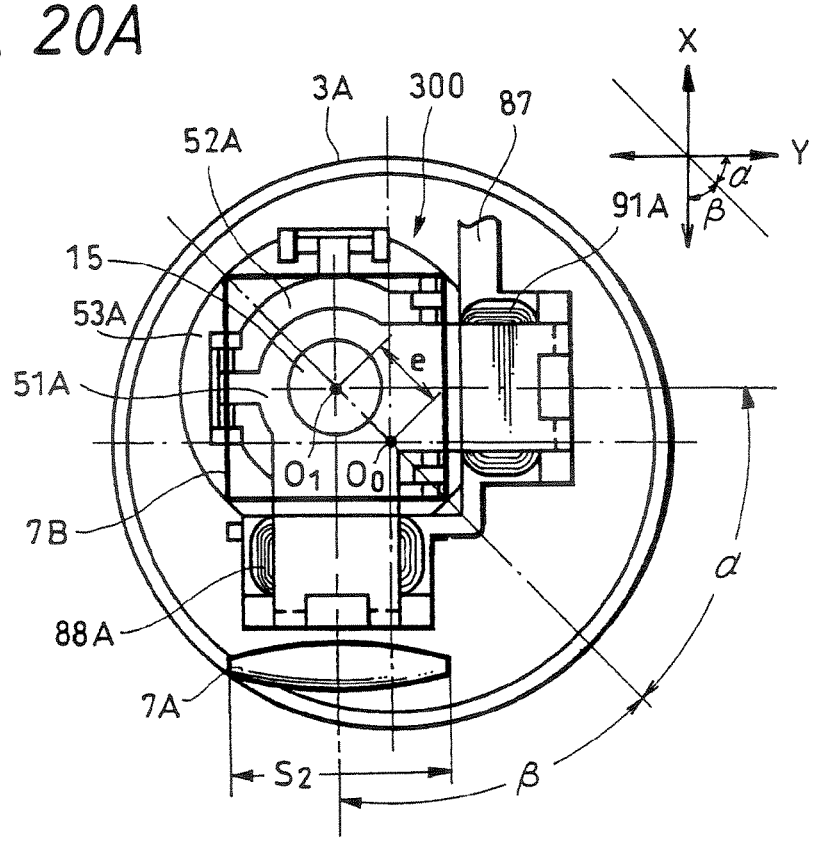
FIGS. 20A and 20B are views for explaining a technology on which an image stabilizer according to an embodiment of the present invention is based, where
Figure 20B:
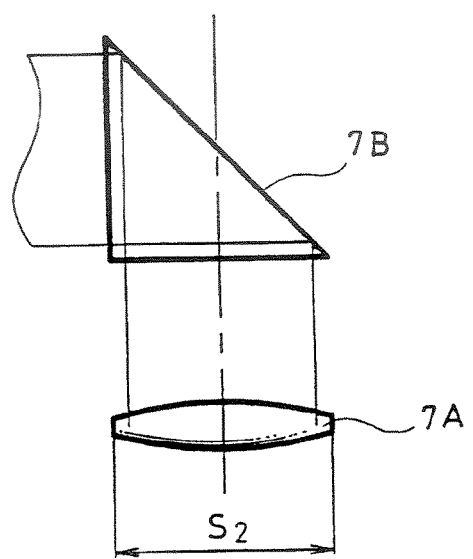

However, as is obvious from FIG. 20A, the objective lens 7A in the first-group lens 7 may not be prevented from being in contact with the inner surface of the hole of the lens barrel 3A in a state in which the optical axis L of a bent part in the lens system 2 is only moved parallel with the first direction X (or second direction Y). Therefore, the diameter $S_2$ of the objective lens 7A may not be enlarged by merely shifting the image stabilizer 300 that moves parallel with the first direction X and second direction Y as described above.

However, there is a large space formed in area surrounded by the first electric actuator and second electric actuator, where an objective lens 7A having a large diameter $S_1$ can be arranged. Accordingly, by shifting the center $O_1$ of the correcting lens 15 in an appropriate direction with respect to the center $O_0$ of the lens barrel 3A and by arranging the objective lens 7A on the opposite side to the direction of the shift, with the center $O_0$ of the lens barrel 3A being the center, an objective lens 7A having a large diameter $S_1$ can be used. In this regard, a bright optical system can be obtained using a large-caliber objective lens. As a result, the amount of light increases, and less blurred images of a subject can be captured using a high shutter speed in the occasion of shooting sports, indoor shooting and the like, without depending upon an image stabilizer in some cases.

Further, according to an embodiment of the present invention, in the case of the correcting lens 15 moving in the first direction X or second direction Y, the movement is obtained by a cooperative operation by the two electric actuators. Therefore, the whole of an image stabilizer can be small-sized with a small moving range, with a predetermined transfer amount being secured and without causing deterioration in the performance of image stabilization. Explanation is given in detail with reference to FIGS. 18A and 18B and FIGS. 19A and 19B.

Figure 19A:
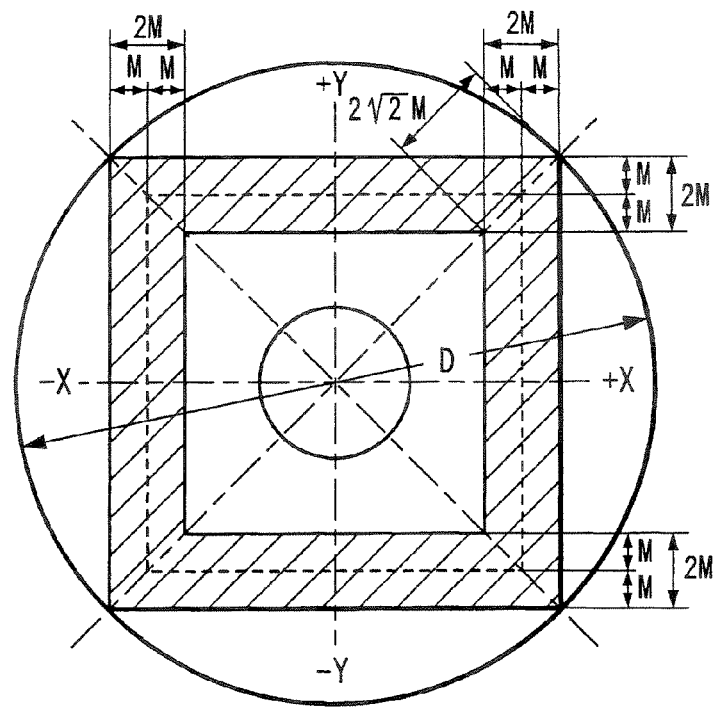
FIGS. 19A and 19B are explanatory diagrams for explaining moving region of a correcting lens relating to an image stabilizer in related art.
Figure 19B:
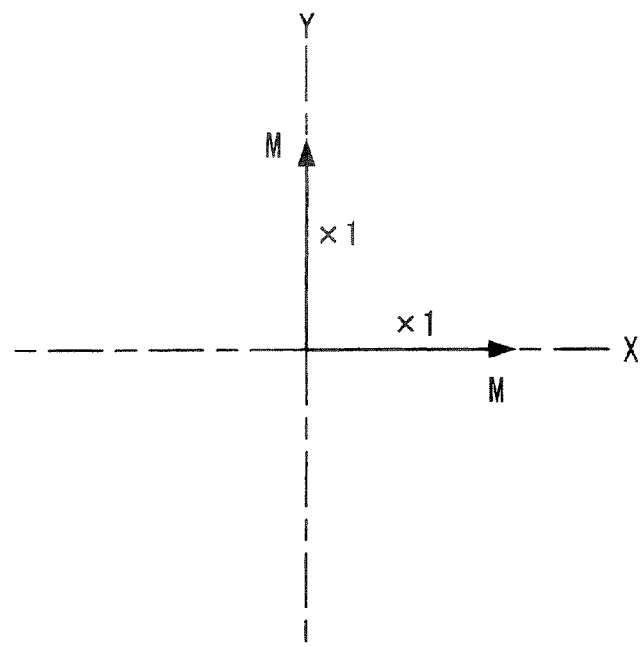

In the case of the related-art technique explained referring to FIGS. 19A and 19B, the direction of thrust generated by a first electric actuator corresponds with the first direction X, and the direction of thrust generated by a second electric actuator corresponds with the second direction Y. Therefore, if the correcting lens is moved in the first direction X with force of 1, the correcting lens is moved in that direction by 1 (multiplied by 1); also, if the correcting lens is moved in the second direction Y with force of 1, the correcting lens is moved in that direction by 1 (multiplied by 1). Supposing that the correcting lens is moved in the first direction X by +M and is moved in the second direction Y by +M, the transfer amount in a direction which intersects the first direction X and second direction Y at an angle of 45° will stand at $\sqrt{2}M$.

In the case of an embodiment of the present invention, on the contrary, as shown in FIGS. 18A and 18B, the direction of thrust generated by the first electric actuator is made to intersect the first direction X at an angle of 45° and the direction of thrust generated by the second electric actuator is made to intersect the second direction Y at an angle of 45°. The transfer amount in a direction which intersects the first direction X and second direction Y at an angle of 45° will stand at $M/\sqrt{2}$. Therefore, supposing that the transfer amount in the first direction X and the transfer amount in the second direction Y are made equal to secure the same moving range as the related-art technique, the inner diameter of the lens barrel 3A can be reduced in size from a diameter D to a diameter D1 (D>D1), as shown in FIG. 18A. Thus, the image stabilizer 300 can be small-sized as a whole to the extent that the aforementioned inner diameter is reduced; and also, through the miniaturization of the image stabilizer 300, the lens device 1 using the image stabilizer 300, and the digital still camera 200 or the like using this lens device 1 can be small sized.

Specifically, as shown in FIG. 18B, in the case of an embodiment of the present invention, regarding force generated in the first moving frame 51A (51B) having the correcting lens 15, supposing that force of 1 is generated at an angle of 45° regarding the X-axis direction (the first direction X) and regarding the Y-axis direction (the second direction Y), the force in the X-axis and Y-axis directions both becomes resultant force of the two electric actuators 54A, and the generated thrust increases by a factor of $\sqrt{2}$. As a result, the power of the electric actuators increases with respect to the X-axis direction and Y-axis direction, thereby enhancing correction capability.

Further, the first and second electric actuators are arranged such that thrust is generated in a direction at an angle of approximately 45° with respect to a first direction X (or second direction Y), for example, that is a vertical direction (longitudinal shake direction) of a subject and with respect to a second direction Y (lateral shake direction, or a first direction X) perpendicular thereto. Hence, similar effectiveness can be obtained in a direct acting lens device in which all lenses and the like are disposed on the same axial center line. Accordingly, there is provided a lens device and an imager apparatus capable of performing excellent shooting, with the same moving range as that of the related-art technique being secured and without causing deterioration in the performance of image stabilization. Moreover, in the case of a lens device having a cylindrical lens barrel and an imager apparatus incorporating the lens device, components can efficiently be installed and an apparatus can be small-sized by offsetting an optical axis against the center of the lens barrel, due to the circumstances of actuators in an image stabilizer, focusing mechanism, zoom mechanism, a shutter mechanism and the like.

Further, in the case where an optical axis is bent by a prism, mirror or the like, an objective lens can be arranged such that the optical axis thereof is directed in a diagonal direction of a moving direction of an image stabilizer 300, by rotationally shifting both first moving direction and second moving direction of the image stabilizer 300 by 45° with respect to vertical and horizontal directions of a subject. Therefore, the caliber of the objective lens can be made larger and a lens system can be bright through an increase in the amount of light caused by enlarging the caliber. Accordingly, less blurred images of a subject can be captured using a high shutter speed, without depending upon the image stabilizer.

FIG. 15 is a block diagram explaining the control concept of the above-described image stabilizer 300. A control unit 130 includes: an image stabilization calculating unit 131; an analog servo unit 132; a driving circuit unit 133; four amplifiers (AMP) 134A, 134B, 135A and 135B; and the like. To the image stabilization calculating unit 131 are connected a first gyro sensor 136 via the first amplifier (AMP) 134A, and a second gyro sensor 137 via the second amplifier (AMP) 134B.

The first gyro sensor 136 detects the amount of displacement in the first direction X caused by a camera shake or the like applied to the camera body 201, and the second gyro sensor 137 detects the amount of displacement in the second direction Y caused by camera shake or the like applied to the camera body 201. Although an example in which the amount of displacement in the first direction X and the amount of displacement in the second direction Y are separately detected by providing two gyro sensors has been explained in this embodiment, needless to say, the amount of displacement in the two directions, the first direction X and second direction Y, may be detected by one gyro sensor.

The analog servo unit 132 is connected to the image stabilization calculating unit 131. The analog servo unit 132 converts a value calculated by the image stabilization calculating unit 131 from a digital value to an analog value, and outputs a control signal corresponding to the analog value. The driving circuit unit 133 is connected to the analog servo unit 132. To the driving circuit unit 133 are connected: the first hall element 94, which is a first position-detecting element, via the third amplifier (AMP) 135A; and the second hall element 95, which is a second position-detecting element, via the fourth amplifier (AMP) 135B. Further, to the driving circuit unit 133 are connected: the first coil 88A, which is a first-direction driving coil; and the second coil 91A, which is a second-direction driving drive coil.

The amount of displacement of the first moving frame 51A in the first direction X, detected by the first hall element 94, is input to the driving circuit unit 133 via the third amplifier 135A. Also, the amount of displacement of the second moving frame 52A in the second direction Y, detected by the second hall element 95, is input to the driving circuit unit 133 via the fourth amplifier 135B. Based upon the input signals and the control signal from the analog servo unit 132, the driving circuit unit 133 outputs a predetermined control signal to either the first coil 88A or the second coil 91 or to both of them, in order to move the correcting lens 15 for stabilizing images.

FIG. 16 is a block diagram showing a first embodiment of a schematic configuration of a digital still camera 200 provided with an image stabilizer 300 having the above-described structure and functions. This digital still camera 200 includes a lens device 1, a control unit 140, a storage apparatus 141, an operation unit 142, a display apparatus 102, an external memory 143 and the like. The lens device 1 has an image stabilizer 300. The control unit 140 plays a central role in a control device. The storage apparatus 141 has a program memory, data memory, other RAM/ROM or the like for driving the control unit 140. The operation unit 142 inputs various instruction signals or the like for turning the power on/off, selecting a shooting mode, performing shooting or the like. The display apparatus 102 displays a captured image or the like. The external memory 143 enlarges storage capacity.

The control unit 140 includes an operational circuit having a microcomputer (CPU); and the like, for example. The storage apparatus 141, the operation unit 142, an analog signal processing unit 144, a digital signal processing unit 145, two A/D converters 146 and 147, a D/A converter 148, and a timing generator (TG) 149 are connected to this control unit 140. The analog signal processing unit 144 is connected to a CCD 4 attached to the lens device 1, and performs predetermined signal processing by means of an analog signal corresponding to a captured image output from the CCD 4. This analog signal processing unit 144 is connected to the first A/D converter 146, and an output thereof is converted to a digital signal by this A/D converter 146.

To the first A/D converter 146 is connected the digital signal processing unit 145 which performs predetermined signal processing by means of a digital signal supplied from the first A/D converter 146. To this digital signal processing unit 145 are connected the display apparatus 102 and the external memory 143, and an image corresponding to a subject is displayed on the display apparatus 102 or stored in the external memory 143, based upon a digital signal that is an output signal thereof. Also, to the second A/D converter 147 is connected a gyro sensor 151 showing a specific example of a blur-detecting unit. A vibration, shake or the like of the digital still camera 200 is detected by this gyro sensor 151, and image stabilization is performed according to the detected result.

To the D/A converter 148 is connected a driving control unit 152 which is a servo calculating unit for image stabilization. The driving control unit 152 stabilizes images by driving and controlling the image stabilizer 300 in accordance with the position of a correcting lens 15. To the driving control unit 152 are connected the image stabilizer 300, and a first position detector 94 and second position detector 95 which are position-detecting units that detect the position of the correcting lens 15 by detecting the positions of two moving frames 51A and 52A. In addition, the timing generator (TG) 149 is connected to the CCD 4.

Thus, when an image of a subject has been input to a lens system 2 of the lens device 1 and then an image has been formed on the focal plane of the CCD 4, an image signal thereof is output as an analog signal to which predetermined processing is carried out at the analog signal processing unit 144 and after that which is converted to a digital signal by the first A/D converter 146. After predetermined processing is carried out at the digital signal processing unit 145, an output from the first A/D converter 146 is displayed on the display apparatus 102 as an image corresponding to the subject, or is stored in an external memory as memory information.

In the above-described shooting state, when a vibration, shake or the like is applied to the digital still camera 200 with the image stabilizer 300 in the operational state, the gyro sensor 151 detects the vibration, shake or the like and then outputs a detection signal thereof to the control unit 140. On receipt of this, the control unit 140 performs predetermined calculation processing, and outputs a control signal which controls the action of the image stabilizer 300 to the driving control unit 152. The driving control unit 152 outputs a predetermined driving signal to the image stabilizer 300 based upon the control signal from the control unit 140, thereby moving the first moving frame 51A in the first direction X by a predetermined amount and moving the second moving frame 52A in the second direction Y by a predetermined amount. This makes it possible to stabilize images by means of the movement of the correcting lens 15 and thus to obtain an excellent image.

FIG. 17 is a block diagram showing a second embodiment of the schematic configuration of a digital still camera provided with an image stabilizer 300 having the above-described structure and functions. This digital still camera 200 includes a lens device 1, a video recording/reproducing circuit unit 160, an internal memory 161, a video signal processing unit 162, a display apparatus 163, an external memory 164, a correcting lens control unit 165 and the like. The lens device 1 has an image stabilizer 300. The video recording/reproducing circuit unit 160 plays a central role in a control device. The internal memory 161 has a program memory, data memory, other RAM/ROM or the like for driving the video recording/reproducing circuit unit 160. The video signal processing unit 162 processes a captured image or the like into a predetermined signal. The display apparatus 163 displays a captured image or the like. The external memory 164 enlarges storage capacity. The correcting lens control unit 165 drives and controls the image stabilizer 300.

The video recording/reproducing circuit unit 160 includes: an operational circuit having a microcomputer (CPU); and the like, for example. The internal memory 161, the video signal processing unit 162, the correcting lens control unit 165, a monitor driving unit 166, an amplifier 167 and three interfaces (I/F) 171, 172 and 173 are connected to this video recording/reproducing circuit unit 160. The video signal processing unit 162 is connected to a CCD 4 attached to the lens device 1, via the amplifier 167, and a signal which has been processed into a predetermined video signal is input to the video recording/reproducing circuit unit 160.

The display apparatus 163 is connected to the video recording/reproducing circuit unit 160 via the monitor driving unit 166. Also, a connector 168 is connected to the first interface (I/F) 171, and the external memory 164 can be connected to this connector 168 in a freely detachable manner. A connecting terminal 174 provided in an apparatus body 201B is connected to the second interface (I/F) 172.

An acceleration sensor 175, which is a blur-detecting unit, is connected to the correcting lens control unit 165 via the third interface (I/F) 173. This acceleration sensor 175 detects displacement applied to the apparatus body 201B due to vibration, shake or the like, as acceleration, and a gyro sensor can be used as this acceleration sensor 175. To the correcting lens control unit 165 are connected: a lens driving unit of the image stabilizer 300, which drives and controls a correcting lens 15; and two position-detecting sensors 94 and 95 which detect the position of the correcting lens 15.

Thus, when an image of a subject has been input to a lens system 2 of the lens device 1 and then an image has been formed on the focal plane of the CCD 4, an image signal thereof is input to the video signal processing unit 162 via the amplifier 167. A signal which has been processed into a predetermined video signal at this video signal processing unit 162 is input to the video recording/reproducing circuit unit 160. Thus, a signal corresponding to the image of the subject is output from the video recording/reproducing circuit unit 160 to the monitor driving unit 166, and the internal memory 161 or the external memory 164. As a result, an image corresponding to the image of the subject is displayed on the display apparatus 163 via the monitor driving unit 166, or is recorded in the internal memory 161 or in the external memory 164 as an information signal, according to need.

In the above shooting state, when a vibration, shake or the like is applied to the apparatus body 201B with the image stabilizer 300 in the operational state, the acceleration sensor 175 detects the vibration, shake or the like and then outputs a detection signal thereof to the video recording/reproducing circuit unit 160 via the correcting lens control unit 165. On receipt of this, the video recording/reproducing circuit unit 160 performs predetermined calculation processing, and outputs a control signal, which controls the action of the image stabilizer 300, to the correcting lens control unit 165. This correcting lens control unit 165 outputs a predetermined driving signal to the image stabilizer 300 based upon the control signal from the video recording/reproducing circuit unit 160, thereby moving a first moving frame 51A in the first direction X by a predetermined amount and moving a second moving frame 52A in the second direction Y by a predetermined amount. This makes it possible to stabilize images by means of the movement of the correcting lens 15 and thus to obtain an excellent image.

As explained above, according to an image stabilizer of an embodiment of the present invention, a lens device is constructed as a folded lens, and light passing through an objective lens is led to a correcting lens in the image stabilizer after being bent by 90° in a prism. Hence, the correcting lens is parallel with the ground in the case of the posture of an imager device is correct, and a first direction and a second direction, which are the moving directions of the correcting lens, become perpendicular to the direction in which gravity acts. Thus, first and second moving frames which hold the correcting lens in a freely movable manner are not pulled toward the first direction or second direction by gravity, and there is no necessity of continuously applying current to the image stabilizer in order to hold the first and second moving frames in a direction opposed to gravity. As a result, power consumption can be reduced greatly in the case of capturing images with the correct posture of the imager apparatus, enabling the imager apparatus to be used for a long period of time. Further, since the thrust to move the correcting lens is reduced, the weight of the first and second moving frames, namely camera shake acceleration of approximately 1 G, can be allowed, and a shake of a camera such as a more violent camera shake can be coped with.

However, it should be appreciated that an image stabilizer according to an embodiment of the present invention can be used for a direct acting lens device with an optical axis of a correcting lens facing a horizontal direction. In this case also, the whole of an apparatus can be small-sized by making the moving range of the correcting lens small, with the moving distance of the correcting lens in the directions of a longitudinal shake and a lateral shake, which require image stabilization most, being the same as the moving distance of a related-art technique, and without causing deterioration in the performance of image stabilization. Moreover, since the caliber of an objective lens is enlarged, the amount of light in a lens system increases, and therefore an optical system can be brightened, thereby images of a subject being captured with a high shutter speed even in a dark place and obtaining less blurred images.

The present invention is not limited to the embodiments described earlier and shown in the drawings, but various modifications are possible without deviating from the gist of the present invention. For example, although examples in which a digital still camera is used as an imager apparatus have been explained in the above-described embodiments, the present invention can be applied to digital video cameras, camera-equipped personal computers, mobile phone with a built-in camera and other imager apparatuses as well. Further, although examples in which five group lenses are used as a lens device 1 have been explained, it should be appreciated that the present invention can be applied to four group lenses or fewer and also can be applied to six group lenses or more as well.

It should be understood by those skilled in the art that various modifications, combinations, sub-combinations and alterations may occur depending on design requirements and other factors insofar as they are within the scope of the appended claims or the equivalents thereof.

What is claimed is:

1. An image stabilizer comprising:
a driver including a first coil that is supported by a first coil supporting portion of a flexible printed circuit board, a second coil that is supported by a second coil supporting portion of the flexible printed circuit board, a first magnet and a second magnet, the first coil and the first magnet being configured to move relative to each other, the second coil and the second magnet being configured to move relative to each other, said first coil supporting portion of the flexible printed circuit board being directly mounted on a first magnetic plate that is attracted by a magnetic force of the first magnet, said second coil supporting portion of the flexible printed circuit board being directly mounted on a second magnetic plate that is attracted by a magnetic force of the second magnet, said driver being configured to control an optical component;
a first movable frame that holds said optical component and that is configured to move in a first direction perpendicular to an optical axis of a lens system;
a second movable frame that is configured to move in a second direction perpendicular to the first direction and said optical axis, the first movable frame being supported by the second movable frame so as to be movable relative to the second movable frame; and
a fixed support frame, the second movable frame being supported by the fixed support frame so as to be movable relative to the fixed support frame, said first and second coils and said first and second magnets being arranged such that either said first and second coils are fixed to said first movable frame and said first and second magnets are fixed to said fixed support frame or said first and second magnets are fixed to said first movable frame and said first and second coils are fixed to said fixed support frame, said first coil being configured to move said optical component in said first direction, said second coil being configured to move said optical component in said second direction, said first and second magnets being configured to respectively apply magnetic force to said first coil and said second coil, said first coil and said second coil being disposed such that a direction of thrust generated from said first coil by the magnetic force of said first magnet is said first direction and a direction of thrust generated from said second coil by the magnetic force of said second magnet is said second direction, each of said first direction and said second direction forming an angle of approximately 45° with a line connecting the optical axis of said optical component and the center of a lens barrel.

2. An image stabilizer according to claim 1, wherein said first coil and said second coil are obtained by preparing a combination of two flat coils which are levelly wound and which have linear portions configured to be thrust-generating portions that generate thrust.

3. An image stabilizer according to claim 1, wherein said first coil and said second coil are fixed to said first movable frame, and said first and second magnets are fixed to said fixed support frame through yokes.

4. An image stabilizer according to claim 1, wherein said first coil and said second coil are fixed to said fixed support frame, and said first and second magnets are fixed to said first movable frame through yokes.

5. An image stabilizer according to claim 1, wherein said optical component is a correcting lens.

6. An image stabilizer according to claim 5, wherein said first coil and said second coil are obtained by preparing a combination of two flat coils which are levelly wound and which have linear portions configured to be thrust-generating portions that generate thrust.

7. An image stabilizer according to claim 5, wherein said first coil and said second coil are fixed to said first movable frame, and said first and second magnets are fixed to said fixed support frame through yokes.

8. An image stabilizer according to claim 5, wherein said first coil and said second coil are fixed to said fixed support frame, and said first and second magnets are fixed to said first movable frame through yokes.

9. A lens device comprising:
an image stabilizer that includes a driver having a first coil that is supported by a first coil supporting portion of a flexible printed circuit board, a second coil that is supported by a second coil supporting portion of a flexible printed circuit board, a second coil, a first magnet and a second magnet, the first coil and the first magnet being configured to move relative to each other, the second coil and the second magnet being configured to move relative to each other, said first coil supporting portion of the flexible printed circuit board being directly mounted on a first magnetic plate that is attracted by a magnetic force of the first magnet, said second coil supporting portion of the flexible printed circuit board being directly mounted on a second magnetic plate that is attracted by a magnetic force of the second magnet, said driver being configured to control an optical component;
a first movable frame that holds said optical component and that is configured to move in a first direction perpendicular to an optical axis of a lens system;
a second movable frame that is configured to move in a second direction perpendicular to the first direction and said optical axis, the first movable frame being supported by the second movable frame so as to be movable relative to the second movable frame; and
a fixed support frame that is fixed relative to said lens device, the second movable frame being supported by the fixed support frame so as to be movable relative to the fixed support frame, said first and second coils and said first and second magnets being arranged such that either said first and second coils are fixed to said first movable frame and said first and second magnets are fixed to said fixed support frame or said first and second magnets are fixed to said first movable frame and said first and second coils are fixed to said fixed support frame, said first coil being configured to move said optical component in said first direction, said second coil being configured to move said optical component in said second direction, said first and second magnets being configured to respectively apply magnetic force to said first coil and said second coil, said first coil and said second coil being disposed such that a direction of thrust generated from said first coil by the magnetic force of said first magnet is said first direction and a direction of thrust generated from said second coil by the magnetic force of said second magnet is said second, direction, each of said first direction and said second direction forming an angle of approximately 45° with a line connecting the optical axis of said optical component and the center of a lens barrel.

10. A lens device according to claim 9, wherein said first coil and said second coil are obtained by preparing a combination of two flat coils which are levelly wound and which have linear portions configured to be thrust-generating portions that generate thrust.

11. A lens device according to claim 9, wherein said first coil and said second coil are fixed to said first movable frame, and said first and second magnets are fixed to said fixed support frame through yokes.

12. A lens device according to claim 9, wherein said first coil and said second coil are fixed to said fixed support frame, and said first and second magnets are fixed to said first movable frame through yokes.

13. An image stabilizer according to claim 9, wherein said optical component is a correcting lens.

14. An imager apparatus comprising
a lens device that includes an image stabilizer having a driver including a first coil that is supported by a first coil supporting portion of a flexible printed circuit board, a second coil that is supported by a second coil supporting portion of a flexible printed circuit board, a second coil, a first magnet and a second magnet, the first coil and the first magnet being configured to move relative to each other, the second coil and the second magnet being configured to move relative to each other, said first coil supporting portion of the flexible printed circuit board being directly mounted on a first magnetic plate that is attracted by a magnetic force of the first magnet, said second coil supporting portion of the flexible printed circuit board being directly mounted on a second magnetic plate that is attracted by a magnetic force of the second magnet, said driver being configured to control an optical component;
a first movable frame that holds said optical component and that is configured to move in a first direction perpendicular to an optical axis of a lens system;

a second movable frame that is configured to move in a second direction perpendicular to the first direction and said optical axis, the first movable frame being supported by the second movable frame so as to be movable relative to the second movable frame; and a fixed support frame that is fixed relative to said lens device, the second movable frame being supported by the fixed support frame so as to be movable relative to the fixed support frame, said first and second coils and said first and second magnets being arranged such that either said first and second coils are fixed to said first movable frame and said first and second magnets are fixed to said fixed support frame or said first and second magnets are fixed to said first movable frame and said first and second coils are fixed to said fixed support frame said first coil being configured to move said optical component in said first direction, said second coil being configured to move said optical component in said second direction, said first and second magnets being configured to respectively apply magnetic force to said first coil and said second coil, said first coil and said second coil being disposed such that a direction of thrust generated from said first coil by the magnetic force of said first magnet is said first direction and a direction of thrust generated from said second coil by the magnetic force of said second magnet is said second direction, each of said first direction and said second direction forming an angle of approximately 45° with a line connecting the optical axis of said optical component and the center of a lens barrel.

15. An imager apparatus according to claim 14, wherein said first coil and said second coil are obtained by preparing a combination of two flat coils which are levelly wound and which have linear portions configured to be thrust-generating portions that generate thrust.

16. An imager apparatus according to claim 14, wherein said first coil and said second coil are fixed to said first movable frame, and said first and second magnets are fixed to said fixed support frame through yokes.

17. An imager apparatus according to claim 14, wherein said first coil and said second coil are fixed to said fixed support frame, and said first and second magnets are fixed to said first movable frame through yokes.

18. An image stabilizer according to claim 14, wherein said optical component is a correcting lens.

19. An imager apparatus according to claim 18, wherein said first coil and said second coil are fixed to said first movable frame, and said first and second magnets are fixed to said fixed support frame through yokes.

20. An imager apparatus according to claim 18, wherein said first coil and said second coil are fixed to said fixed support frame, and said first and second magnets are fixed to said first movable frame through yokes.

* * * * *